(12) United States Patent
Inoue et al.

(10) Patent No.: US 8,593,029 B2
(45) Date of Patent: Nov. 26, 2013

(54) LUNDELL TYPE ROTATING MACHINE

(75) Inventors: Masaya Inoue, Tokyo (JP); Yoichi Kuroda, Tokyo (JP); Masao Morita, Tokyo (JP); Moriyuki Hazeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 89 days.

(21) Appl. No.: 13/497,731

(22) PCT Filed: Sep. 16, 2010

(86) PCT No.: PCT/JP2010/066012
§ 371 (c)(1),
(2), (4) Date: Mar. 22, 2012

(87) PCT Pub. No.: WO2011/040247
PCT Pub. Date: Apr. 7, 2011

(65) Prior Publication Data
US 2012/0187794 A1 Jul. 26, 2012

(30) Foreign Application Priority Data

Sep. 30, 2009 (JP) ................................. 2009-227448
Jun. 16, 2010 (JP) ................................. 2010-137528

(51) Int. Cl.
*H02K 1/22* (2006.01)
*H02K 21/12* (2006.01)

(52) U.S. Cl.
USPC ............ 310/156.66; 310/156.67; 310/156.68; 310/156.69; 310/156.71; 310/156.72; 310/156.73; 310/263

(58) Field of Classification Search
USPC ............. 310/156.66–156.69, 156.71–156.73, 310/263, 261.1
IPC .............................................. H02K 1/22,21/12
See application file for complete search history.

(56) References Cited

U.S. PATENT DOCUMENTS

| | | | |
|---|---|---|---|
| 5,955,807 A * | 9/1999 | Kajiura et al. | ............ 310/156.66 |
| 6,037,695 A | 3/2000 | Kanazawa et al. | |
| 6,157,111 A | 12/2000 | Asao | |
| 7,919,892 B2 * | 4/2011 | Neet et al. | ........................ 310/90 |
| 7,982,358 B2 * | 7/2011 | York et al. | ..................... 310/263 |

(Continued)

FOREIGN PATENT DOCUMENTS

| | | |
|---|---|---|
| JP | 4 165950 | 6/1992 |
| JP | 4 251553 | 9/1992 |

(Continued)

OTHER PUBLICATIONS

International Search Report issued on Nov. 22, 2010 in PCT/JP10/66012 filed on Sep. 16, 2010.

*Primary Examiner* — Quyen Leung
*Assistant Examiner* — Terrance Kenerly
(74) *Attorney, Agent, or Firm* — Oblon, Spivak, McClelland, Maier & Neustadt, L.L.P.

(57) ABSTRACT

Provided is a Lundell type rotating machine with high efficiency and high output, which has a rigid and magnetically advantageous magnet retention structure. A rotor iron core includes laminated magnetic-pole members mechanically and magnetically coupled to two laminated magnetic end plates, which extend in an axial direction so as to be brought into meshing engagement with each other to constitute a Lundell type rotor iron core, and permanent magnets provided between the magnetic-pole members. The magnetic-pole members are retained in predetermined positions between the magnetic end plates by dovetail grooves of a non-magnetic retention body over substantially the entire lengths. The permanent magnets are held in direct contact with the magnetic-pole members so as to be interposed therebetween. Thus, the magnet retention structure which is mechanically rigid and magnetically highly efficient even when increased in size can be obtained.

11 Claims, 29 Drawing Sheets

(56) References Cited

U.S. PATENT DOCUMENTS

2008/0012448 A1* 1/2008 Hayashi .................. 310/263
2009/0200886 A1* 8/2009 Morita et al. ............. 310/181

FOREIGN PATENT DOCUMENTS

| | | |
|---|---|---|
| JP | 06 133478 | 5/1994 |
| JP | 07 312854 | 11/1995 |
| JP | 8 308192 | 11/1996 |
| JP | 11 41887 | 2/1999 |
| JP | 11 150902 | 6/1999 |
| JP | 2001 359264 | 12/2001 |
| JP | 2002 247817 | 8/2002 |
| JP | 2002 315285 | 10/2002 |
| JP | 2004 88823 | 3/2004 |
| JP | 2004 129358 | 4/2004 |

* cited by examiner

LUNDELL TYPE ROTATING MACHINE

TECHNICAL FIELD

The present invention relates to a Lundell type rotating machine.

BACKGROUND ART

A Lundell type rotating machine is a rotating machine which excites comb-like rotor magnetic poles with a field magnetomotive force. Through adjustment of the field magnetomotive force, a magnetic flux can be easily adjusted in accordance with a rotating speed and an output. Therefore, the Lundell type rotating machine has been traditionally used mainly for a power generator for automobiles. The Lundell type rotating machine is relatively small in size when included in such a small-sized power generator. In general, claw-like magnetic poles are often formed by forging. However, the claw-like magnetic poles, which are integrally formed by forging, supports all centrifugal force acting on claw portions thereof by yoke portions at the bottom of the claw-type magnetic poles. Therefore, a load thereon in terms of mechanical strength is large. Thus, when the size of the Lundell type rotating machine is increased in an axial direction, in particular, the claw-like magnetic poles cannot bear the centrifugal force. Hence, there is a mechanical restriction in the axial length direction. Moreover, in magnetical terms, when an axis of a rotor is increased in length, a magnetic path of the rotor is more likely to be magnetically saturated, thereby causing effective use of the field magnetomotive force to be difficult. For those reasons, the Lundell type rotating machine is difficult to design when, in particular, the axis thereof is to be increased in the axial length, and therefore is mainly used for small machines.

Moreover, each of the magnetic poles formed by forging is made of an iron ingot. Therefore, a surface thereof allows a large eddy current to flow therethrough, and due to generation of the eddy current on the surface, efficiency is lowered. For those reasons, the Lundell type rotating machine has been rarely used in the field of products such as large-sized power generators, hybrid cars, and electric automobiles, which require high output and high efficiency.

In order to overcome the above-mentioned problems, a method of retaining laminated magnetic poles by a non-magnetic ring to configure a magnetic path equivalent to that of each of the claw-type magnetic poles has been proposed (for example, see Patent Literature 1).

As another technology, a technology of retaining an iron core with a non-magnetic ring and embedding permanent magnets into the non-magnetic ring to increase an output has also been proposed (for example, see Patent Literature 2).

CITATION LIST

Patent Literature

Patent Literature 1: JP 6-133478 A
Patent Literature 2: JP 6-22482 A

SUMMARY OF INVENTION

Technical Problems

In Patent Literature 1 described above, however, a sectional area of the magnetic path of each of the claw-like magnetic poles is reduced to hold non-magnetic flange members for supporting the claw-like magnetic poles between the claws. Therefore, an output is lowered by the magnetic saturation. Moreover, the rotor is formed by the combination of the massive iron core and the laminated magnetic body. Therefore, a reduction of a loss of the eddy current inside the rotor, which is generated by a fluctuation in magnetic field in the rotor due to an armature counter flux of a stator, is not sometimes sufficient.

Moreover, in the prior art 2, the magnets are provided in the non-magnetic ring, and a magnetic gap is present around each of the magnets. Therefore, a magnetic resistance is large, and a space in which each of the magnets is provided is a limited region between the magnetic poles. Therefore, the effect of improving the output with the magnets is not sometimes sufficient.

Therefore, an object of the present invention is to provide a Lundell type rotating machine with high efficiency and high output, which has high magnet use efficiency and a rigid magnetic retention structure.

Solution to Problem

According to an exemplary embodiment of the present invention, there is provided a Lundell type rotating machine including: a stator including a stator iron core having stator magnetic poles, and a stator coil wound around the stator magnetic poles; a rotating shaft rotating relative to the stator; a rotor iron core provided on the rotating shaft, having magnetic poles opposed to the stator magnetic poles to be able to magnetically coupled thereto, and rotating relative to the stator inside the stator; permanent magnets provided between the magnetic poles and magnetized in a circumferential direction of the rotating shaft, for reducing leakage of a magnetic flux between the magnetic poles; and a field coil provided on a radially inner side of the magnetic poles of the rotor iron core, for generating the magnetic flux in the rotor iron core and the stator iron core, in which the rotor iron core includes: a first magnetic endplate and a second magnetic end plate, each having a disc-like shape, coaxially supported on the rotating shaft and separated away from each other; a plurality of first magnetic-pole members arranged in a circumferential direction of the rotating shaft at intervals, each having one end magnetically and mechanically coupled to the first magnetic end plate and extending in an axial direction of the rotating shaft toward the second magnetic end plate and another end magnetically separated away from the second magnetic end plate; a plurality of second magnetic-pole members arranged in the circumferential direction at intervals, each having one end magnetically and mechanically coupled to the second magnetic endplate and extending in the axial direction toward the first magnetic end plate and another end magnetically separated away from the first magnetic end plate, the plurality of second magnetic-pole members being respectively inserted between the plurality of first magnetic-pole members so as to constitute the magnetic poles in cooperation with the plurality of first magnetic-pole members; and a non-magnetic retention body provided between the first magnetic end plate and the second magnetic end plate, for supporting the plurality of first magnetic-pole members and the plurality of second magnetic-pole members over substantially entire lengths thereof.

Advantageous Effects of Invention

According to the present invention, the Lundell type rotating machine having the magnetic retention structure which is rigid against a centrifugal force and is magnetically highly efficient even when increased in size can be obtained.

DESCRIPTION OF EMBODIMENTS

Figure 1:
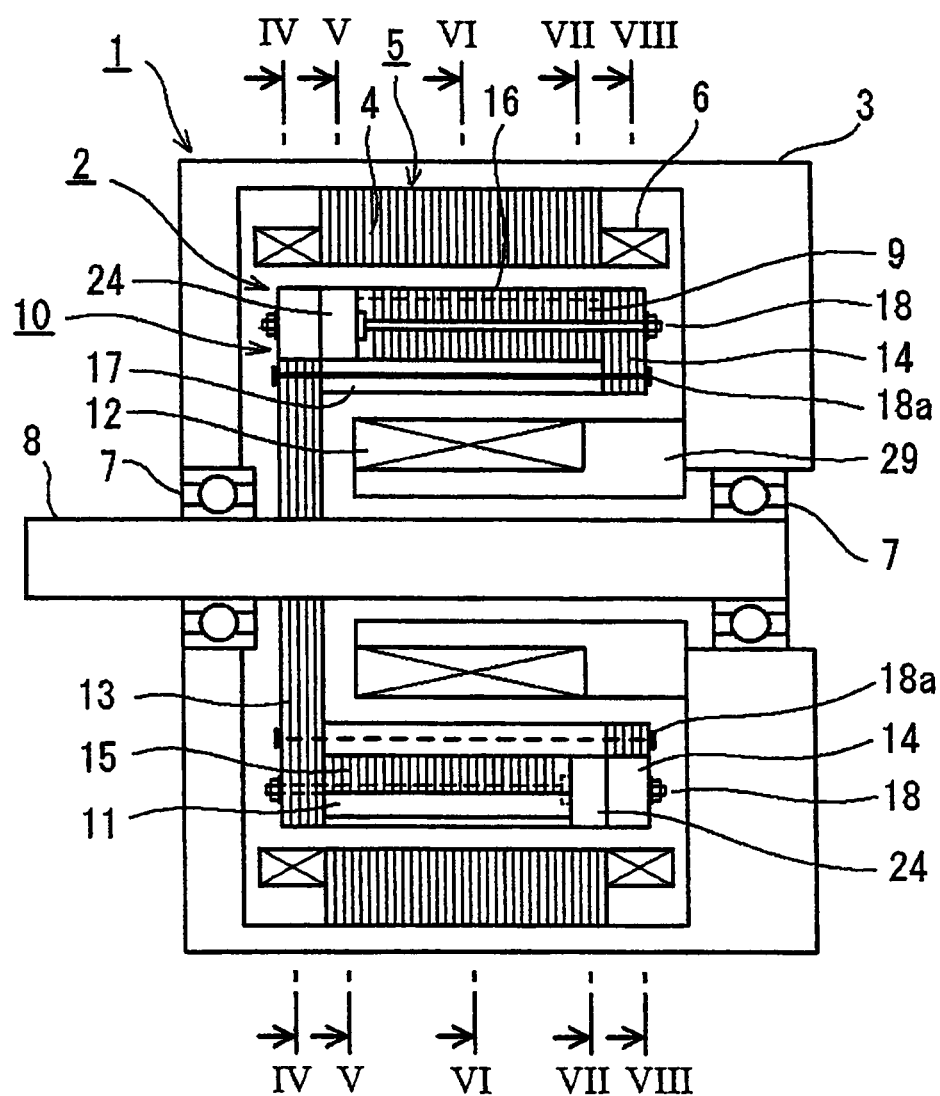
FIG. 1 A view illustrating a Lundell type rotating machine according to a first embodiment of the present invention, which is a schematic sectional view taken along the line I-I of FIG. 6.
Figure 2:
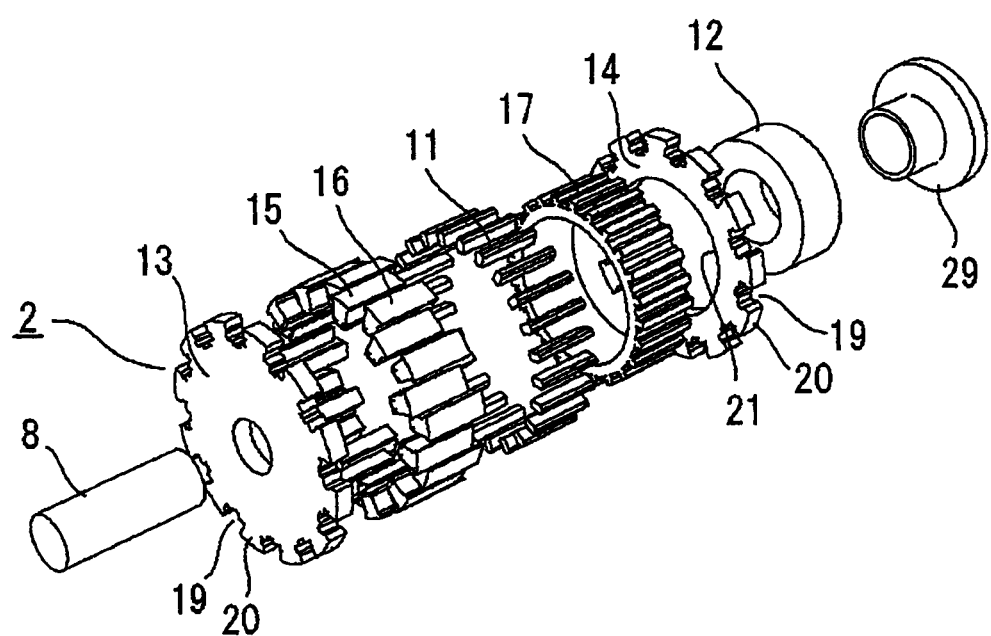
FIG. 2 A schematic exploded perspective view of a rotor of the Lundell type rotating machine illustrated in FIG. 1.

Hereinafter, embodiments of the present invention are described.

Embodiment 1

FIGS. 1 to 8 illustrate a Lundell type rotating machine according to a first embodiment of the present invention. The Lundell type rotating machine of this embodiment is a brushless rotating machine, and includes a stator 1 having a substantially hollow cylindrical shape and a rotor 2 supported coaxially with the stator 1 so as to be rotatable inside the rotor 1. The stator 1 includes a frame body 3 having a hollow cylindrical shape, a stator iron core 5 having a plurality of stator magnetic poles 4 firmly fixed onto an inner circumferential surface of a cylindrical portion of the frame body 3, and a stator coil 6 wound around the stator magnetic poles 4.

The rotor 2 includes a rotating shaft 8 supported coaxially with the stator 1 by a bearing 7 so as to be rotatable relative to the stator 1, a rotor iron core 10 firmly fixed onto the rotating shaft 8 by shrinkage fitting or the like, which has a plurality of magnetic poles 9 and rotates relative to the stator 1 inside the stator 1, and permanent magnets 11 arranged between the plurality of magnetic poles 9 of the rotor iron core 10 so that directions of the magnetic poles are alternated, which are magnetized in a circumferential direction of the rotating shaft, for reducing leakage of a magnetic flux between the magnetic poles 9. When the permanent magnets 11 are made of rare-earth bond magnets molded of sintered ferrite or an insulator, an eddy current is not generated in magnet portions, and therefore an undesirable loss is not generated. Accordingly, efficiency of the permanent magnets 11 can be enhanced. The magnetic poles 9 are arranged apart from each other in the circumferential direction so as to be opposed to the stator magnetic poles 4 in a radial direction of the rotating shaft and can be magnetically coupled to the stator magnetic poles 4 through voids. The Lundell type rotating machine further includes a field coil 12 provided on a radially inner side of the magnetic poles 9 of the rotor iron core 10 so as to be supported by the frame body of the stator 1 through an intermediation of a magnetic base 29, for generating a magnetic flux in the rotator iron core 10 and the stator iron core 5.

The rotor iron core 10 of the Lundell type rotating machine of the present invention includes a first magnetic end plate 13 and a second magnetic end plate 14, each having a disc-like shape, which are coaxially supported on the rotating shaft 8 and separated away from each other, a plurality of first magnetic-pole members 15 arranged at intervals in the circumferential direction, each having one end magnetically and mechanically coupled to the first magnetic end plate 13 and another end extending in an axial direction of the rotating shaft toward the second magnetic end plate 14 so as to be magnetically separated away from the second magnetic end plate 14, a plurality of second magnetic pole members 16 arranged at intervals in the circumferential direction and respectively inserted between the first magnetic-pole members 15 so as to constitute the magnetic poles 9 of the rotor 2 described above in cooperation with the first magnetic pole members 15, each second magnetic-pole member 16 having one end magnetically and mechanically coupled to the second magnetic end plate 14 and another end extending in the axial direction toward the first magnetic end plate 13 so as to be magnetically separated away from the first magnetic end plate 13, and a non-magnetic retention body 17 provided between the first magnetic end plate 13 and the second magnetic end plate 14, for supporting the first magnetic-pole members 15 and the second magnetic-pole members 16 over substantially the entire lengths thereof.

Figure 4:
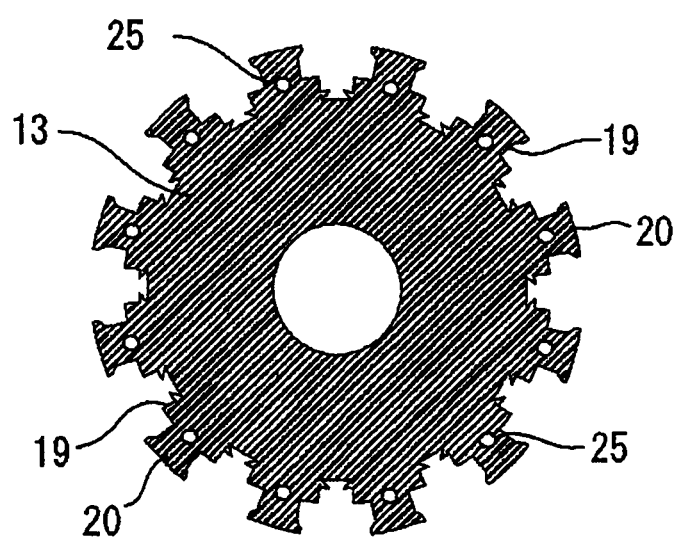
FIG. 4 A sectional view illustrating a first magnetic end plate of the rotor of the Lundell type rotating machine, corresponding to the line IV-IV of FIG. 1.
Figure 8:
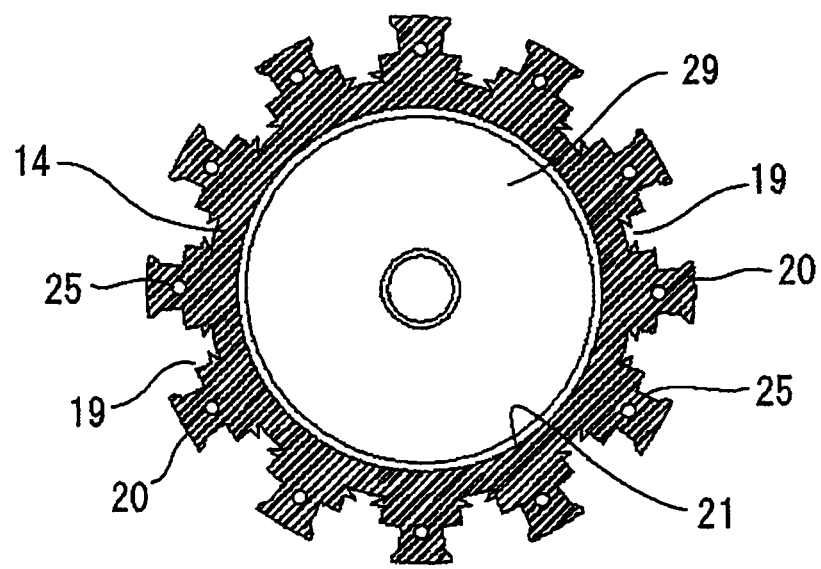
FIG. 8 A sectional view illustrating the relationship between a second magnetic end plate and a magnetic base of the rotor of the Lundell type rotating machine, corresponding to the line VIII-VIII of FIG. 1.

Each of the first magnetic end plate 13, the second magnetic end plate 14, the first magnetic-pole members 15, and the second magnetic-pole members 16 is formed of a laminate of a plurality of magnetic plates laminated in the axial direction, and in the illustrated example, is firmly assembled together with the permanent magnets 11 to be retained by retention with fastening bolts (through bolts) 18 and fastening bolts (through bolts) 18a, each corresponding to fastening means passing through the laminate to achieve fastening as well as by retention by the retention body 17 corresponding to a non-magnetic cylindrical member. Specifically, an inner circumferential edge of the first magnetic end plate 13 is firmly fixed to the rotating shaft 8 by shrinkage fitting or the like. The second magnetic end plate 14 is arranged so as to be opposed to and separated away in parallel from the first magnetic plate 13. To an outer circumferential edge portion of a planar shape of the first magnetic end plate 13, as illustrated in FIG. 4, notches 19 for a purpose described in detail below are provided. Between the notches 19, convex portions 20 are provided in a number corresponding to the number of the stator magnetic poles 4. A planar shape of the second magnetic end plate 14, as illustrated in FIG. 8, is similar to that of the first magnetic end plate 13 in that the notches 19 and the convex portions 20 are provided. However, phases of the notches 19 and the convex portions 20 of the second magnetic end plate 14 are shifted so as to correspond to each other in the axial direction. Moreover, the second magnetic end plate has an inner circumferential edge 21 having a larger diameter than that of the first magnetic end plate.

Figure 5:
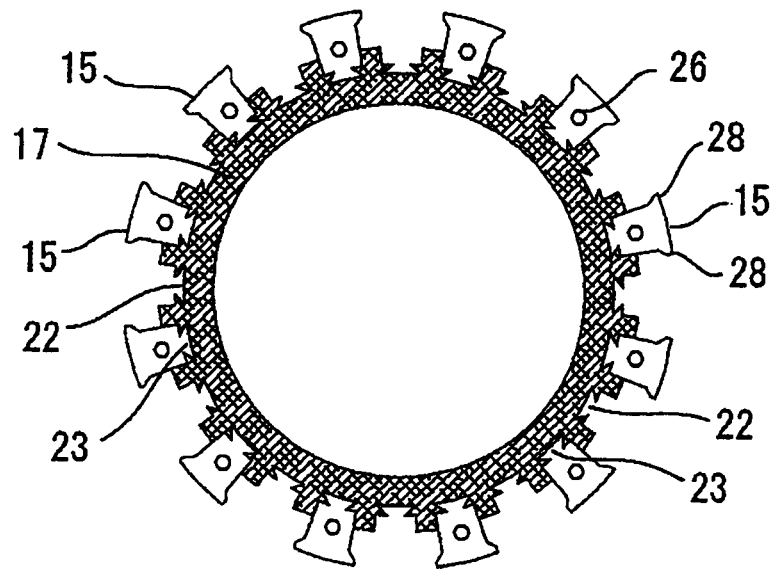
FIG. 5 A sectional view illustrating the relationship between a retention body and first magnetic-pole members of the rotor of the Lundell type rotating machine, corresponding to the line V-V of FIG. 1.
Figure 6:
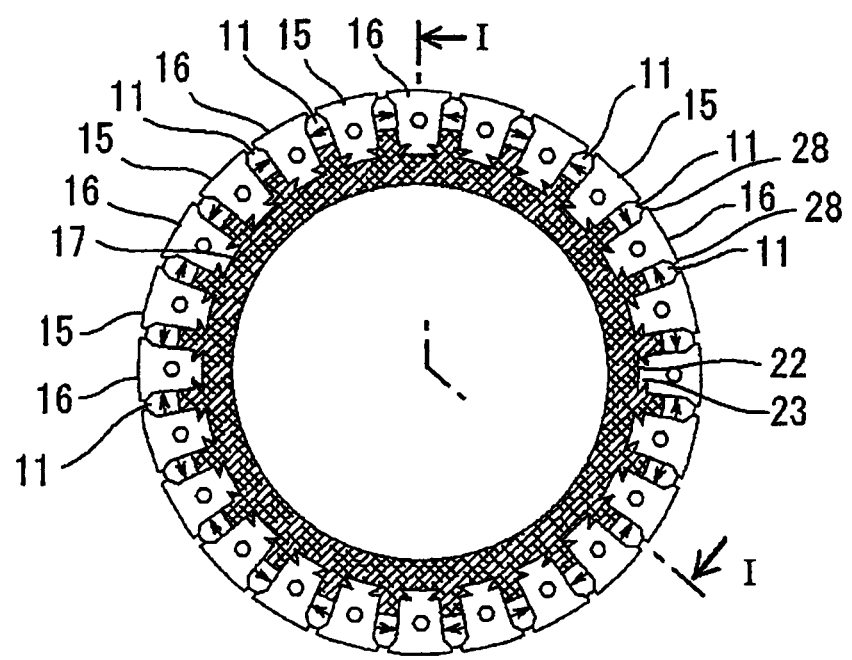
FIG. 6 A sectional view illustrating the relationship among the retention body, the first magnetic-pole members, and permanent magnets of the rotor of the Lundell type rotating machine, corresponding to the line VI-VI of FIG. 1.
Figure 7:
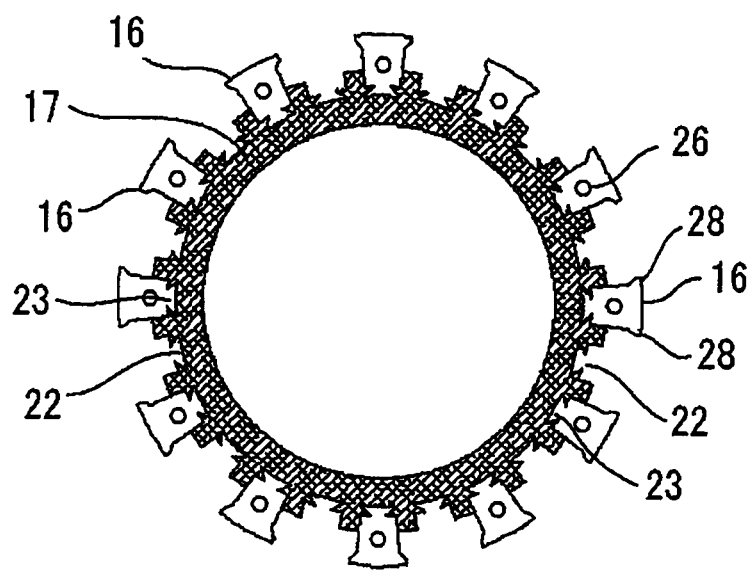
FIG. 7 A sectional view illustrating the relationship between the retention body and second magnetic-pole members of the rotor of the Lundell type rotating machine, corresponding to the line VII-VII of FIG. 1.

Between the first magnetic end plate 13 and the second magnetic end plate 14, as illustrated in FIGS. 5 to 7, the retention body 17 having a substantially cylindrical shape and having an outer circumferential portion provided with dovetail grooves 22 extending in the axial direction is provided and fastened by the fastening bolt 18a. Dovetails 23 of the first magnetic-pole member 15 and the second magnetic-pole member 16 having a planar shape as illustrated in FIG. 6, each being a laminate of a large number of magnetic plates, are inserted into the dovetail grooves 22, and fix the first magnetic-pole members 15 and the second magnetic-pole members 16 in the radial direction and the circumferential direction. As is most clearly illustrated in FIG. 3, the one end (left end in FIG. 3) of each of the first magnetic-pole members 15 directly abuts against the first magnetic end plate 13, whereas the another end (right end in FIG. 3) thereof extends in the axial direction toward the second magnetic end plate 14 so as to form a space, specifically, a void 24, together with the second magnetic end plate 14. Similarly, the one end (right end in FIG. 3) of each of the second magnetic-pole members 16 directly abuts against the second magnetic end plate 14, whereas the another end (left end in FIG. 3) thereof extends in the axial direction toward the first magnetic end plate 13 so as to form the void 24 together with the first magnetic end plate 13. In order to fix, in the axial direction, the first magnetic-pole members 15 and the second magnetic-pole members 16 corresponding to the laminates, the fastening bolts 18 pass through bolt holes 25 formed through the convex portions 20 of the first magnetic end plate 13 and the second magnetic end plate 14 and through bolt holes 26 of the first magnetic-pole members 15 and the second magnetic-pole members 16. Head portions 27 of the fastening bolts 18 are prevented from projecting from end surfaces on the another ends of the first magnetic-pole members 15 and the second magnetic-pole members 16 so as not to cause leakage of a magnetic flux.

The first magnetic-pole members 15 and the second magnetic-pole members 16 which are arranged in parallel to each other in the axial direction and alternately in the circumferential direction as described above are supported in the radial direction and the circumferential direction by engagement between the dovetails 23 and the dovetail grooves 22 of the retention body 17, and are also supported in the axial direction in addition to the radial direction and the circumferential direction by the fastening to the first magnetic end plate 13 and the second magnetic end plate 14 by the fastening bolts 18. The first magnetic-pole members 15 and second magnetic-pole members 16 thus supported are combined with each other so as to extend from the opposite sides in the axial direction to enable meshing engagement of distal end portions thereof, thereby constituting a Lundell type magnetic iron core.

Figure 3:
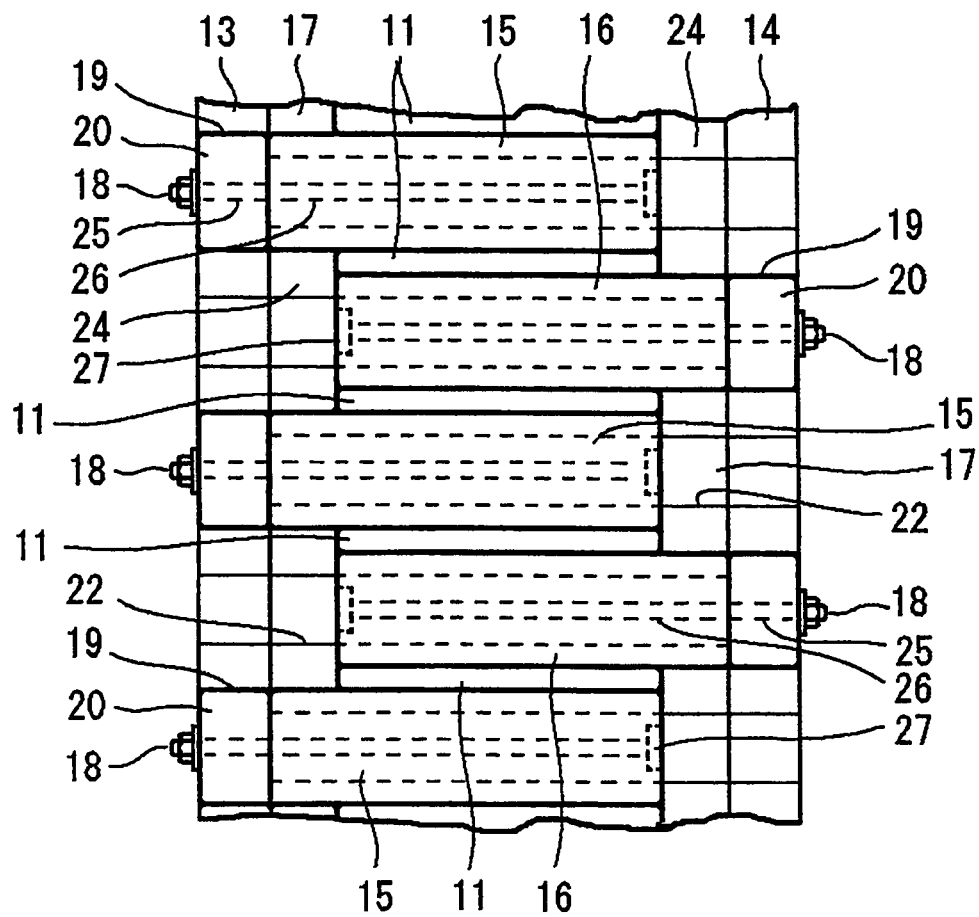
FIG. 3 A schematic development view of an outer peripheral surface of the rotor of the Lundell type rotating machine illustrated in FIG. 1.

As illustrated in FIGS. 3 and 6, voids extending in the axial direction are formed between circumferential side surfaces of the first magnetic-pole members 15 and the second magnetic-pole members 16. In the voids, the permanent magnets 11 are inserted and retained. Specifically, peaked portions 28 are formed at radially outer corners of the first magnetic-pole members 15 and the second magnetic-pole members 16. When the first magnetic-pole members 15 and the second magnetic-pole members 16 are brought into engagement with the retention body 17, each of the voids formed by the side surfaces of the first magnetic-pole members 15 and the second magnetic-pole members 16 and the outer circumferential surface of the retention body 17 is formed so that a width on the inner side is large and a width on the outer side is narrowed by the peaked portions 28. Therefore, the permanent magnets 11 inserted into the voids are supported by direct contact with the side surfaces of the first magnetic-pole members 15 and the second magnetic-pole members 16, and are locked by the peaked portions 28 so as not to be removed in the radial direction. The permanent magnets 11 directly abut against the first magnetic-pole members 15 and the second magnetic-pole members 16 as described above. Therefore, even with the ferrite magnets having a small magnetic gap, which is relatively inexpensive, a magnetic-saturation reducing effect by the magnets can be enhanced. As a result, a reduction in output due to magnetic saturation of the rotor is reduced even when a large field magnetomotive force is applied to the field coil. Therefore, a motor with a high torque can be obtained.

As described above, the first magnetic-pole members 15 supported by the fastening bolts 18 on the first magnetic end plate 13 firmly fixed onto the rotating shaft 8 and the second magnetic-pole members 16 supported by the fastening bolts 18 on the second magnetic end plate 14 having the inner circumferential edge 21 arranged apart from the rotating shaft 8 are each supported by the engagement of the dovetails 23 with the dovetail grooves 22 formed on the outer circumference of the retention body 17 over the entire axial length thereof. Moreover, the permanent magnets 11 supported between the first magnetic-pole members 15 and the second magnetic-pole members 16 are supported by the first magnetic-pole members 15, the second magnetic-pole members 16, and the retention body 17 over substantially the entire lengths of the permanent magnets 11. Further, the whole assembly as described above is fastened by the fastening bolts 18a passing through the retention body 17 to be fastened to the first magnetic end plate 13 and the second magnetic end plate 14. Therefore, the rotor iron core 10 becomes an assembly having high rigidity as a whole. Even when an axial size of the rotor iron core 10 is large, a sufficient mechanical strength can be obtained. Moreover, the rotor iron core 10 includes the first magnetic end plate 13 and the second magnetic end plate 14, which are independent of each other, and the first magnetic-pole members 15, the second magnetic-pole members 16, and the retention body 17 having the dovetail grooves 22 for assembly. Therefore, fabrication and assembly of the rotor iron core 10 are easy. Further, the rotor iron core 10 is formed of the laminate of the magnetic plates. Therefore, an eddy current loss inside a magnetic body for axial magnetic linkage, which is generated by a fluctuation in magnetic flux passing through the inside of the magnetic body for axial magnetic linkage, is eliminated.

In the illustrated example, the field coil 12 is supported by the magnetic base 29 fixed to the frame body 3 of the stator 1 so that the magnetic flux generated by the field coil 12 passes through the magnetic base 29, the first magnetic end plate 13, the first magnetic-pole members 15, the second magnetic-pole members 16, the stator magnetic poles 4, and the second magnetic end plate 14, to thereby allow the field coil 12 to be magnetically coupled to the rotor iron core 10 through the voids. Therefore, a complicated mechanism for supplying electric power to the field coil 12, such as a slip ring, is not required. The field coil 12 may also be fixed to the rotor iron core 10 side. The magnetic base 29 may be a massive iron core. However, with use of a pressurized-powder iron core (for example, SOMALOY (commercial name) fabricated by Höganäs AB or the like), the eddy current inside the rotor can be suppressed when the stator magnetic fluxes interlink or when the magnetic flux of the field coil is changed. Therefore, the efficiency of the Lundell type rotating machine can be further enhanced.

The notches 19 and the convex portions 20 are formed in the outer peripheral edge portions of the first magnetic end plate 13 and the second magnetic end plate 14. As illustrated in FIG. 5 or 7, a shape of the notches 19 is substantially identical, which is the same as or slightly larger than an outer profile of each of concave portions formed in a state in which the first magnetic-pole members 15 or the second magnetic-pole members 16 are alternately inserted into the dovetail grooves 22 of the retention body 17. The notches 19 are provided so as to correspond to the positions obtained by extending the dovetail grooves 22 of the retention body 17 in the axial direction. Therefore, at the time of assembly of the rotor 2, the components can be sequentially inserted in the axial direction and assembled. Thus, assembly work is easy.

Embodiment 2

Figure 9:
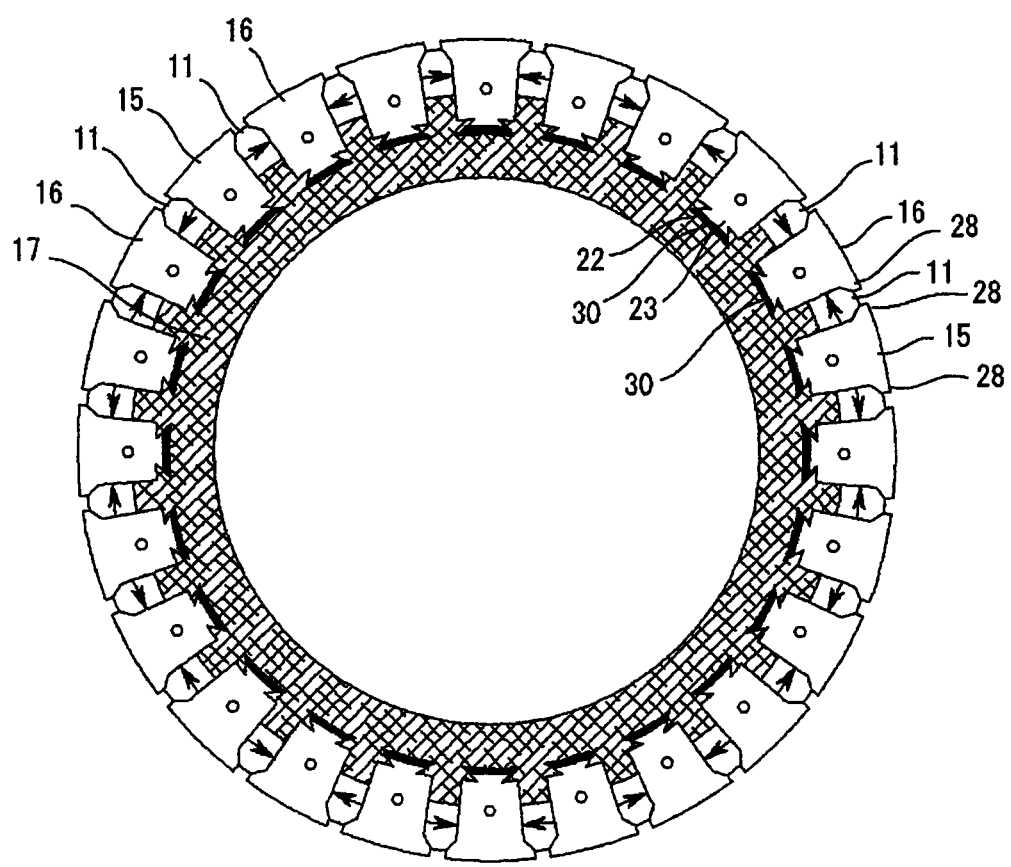
FIG. 9 A view illustrating a Lundell type rotating machine according to a second embodiment of the present invention, which is a sectional view similar to FIG. 6.
Figure 10:
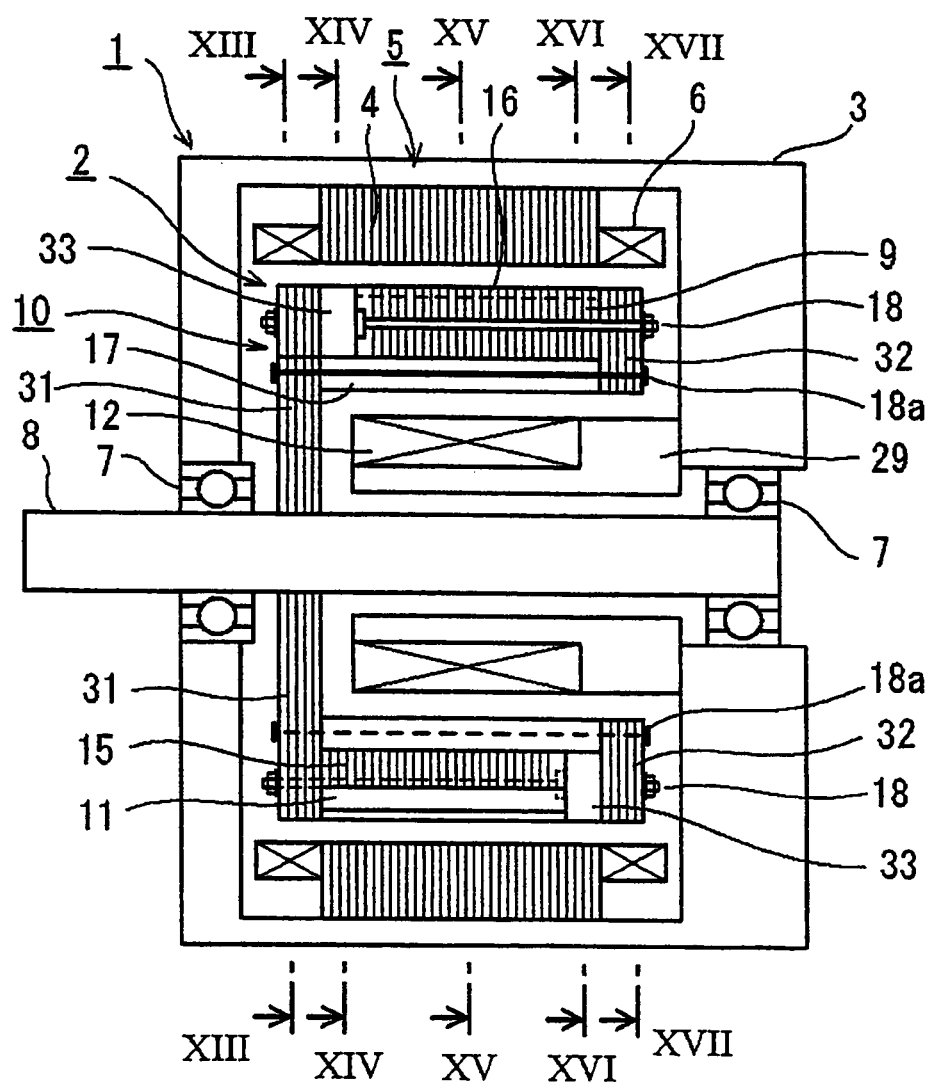
FIG. 10 A view illustrating a Lundell type rotating machine according to a third embodiment of the present invention, which is a schematic sectional view similar to FIG. 1.

FIG. 9 illustrates a cross section of an axial middle portion of a rotor iron core 10 of a Lundell type rotating machine according to a second embodiment of the present invention, and corresponds to FIG. 6 which is a sectional view taken along the line VI-VI of FIG. 1. The rotor iron core 10 includes elongated flat plate-like magnetic bodies 30 which are inserted into bottom portions of dovetail grooves 22 of a retention body 17 and which extend in the axial direction. Specifically, magnetic bodies 30 are inserted into the bottom portions of the dovetail grooves 22. Above the magnetic bodies 30, dovetails 23 of first magnetic-pole members 15 and second magnetic-pole members 16 are inserted and supported. The magnetic bodies 30 are provided in the dovetail grooves 22 so as to be retained in the radial direction over the entire length by the first magnetic-pole members 15 and the second magnetic-pole members 16, and therefore can be made of a green compact such as, for example, SOMALOY (commercial name) fabricated by Höganäs AB, which is insufficient in mechanical strength and is difficult to use. In this example, the magnetic bodies 30 are pressurized-powder magnetic cores obtained by compressing and molding a magnetic powder. The remaining configuration is the same as that of the first embodiment.

In the Lundell type rotating machine as described above, the magnetic bodies 30 extend in a direction of lamination of the first magnetic-pole members 15 and the second magnetic-pole members 16 corresponding to the laminates, to thereby form bypass magnetic paths in the axial direction for the first magnetic-pole members 15 and the second magnetic-pole members 16 corresponding to the laminated magnetic bodies having a large magnetic resistance in the axial direction corresponding to the direction of lamination so as to short-circuit the magnetic paths in the direction of lamination. In this manner, the axial magnetic resistance of the first magnetic-pole members 15 and the second magnetic-pole members 16 can be reduced. Moreover, the green compact causes less generation of the eddy current for the fluctuation in magnetic flux. When the field coil is suddenly changed in response to an instantaneous high output or when an armature counter flux from a stator 1 enters an inside of a rotor 2, an eddy current generated in the magnetic bodies 30 due to the fluctuation in magnetic flux can be suppressed. As a result, the Lundell type rotating machine with a small loss and high efficiency can be obtained.

Embodiment 3

In a Lundell type rotating machine according to a third embodiment of the present invention, which is illustrated in FIGS. 10 to 17, a rotor iron core 10 includes permanent magnets 33, each being long in the circumferential direction and magnetized in the axial direction, provided between each of a first magnetic end plate 31 and a second magnetic end plate 32 and another ends (distal end portions of magnetic poles, specifically, ends which are not coupled to the first magnetic end plate 31 or the second magnetic end plate 32) of first magnetic-pole members 15 and of second magnetic-pole members 16. Specifically, the permanent magnets 33 are provided in the voids 24 formed between the distal end portions of the first magnetic-pole members 15 and of the second magnetic-pole members 16 and each of the first magnetic end plate 13 and the second magnetic end plate 14 in the Lundell type rotating machine illustrated in FIGS. 1 to 8. As is apparent from FIGS. 11, 12, 14 and the like, the permanent magnets 33 are long in the circumferential direction, each having a substantially rectangular parallelepiped block-like shape, have end faces including side faces which come into abutment against the distal end portions of the first magnetic-pole members 15 and the second magnetic-pole members 16, and have dovetails 23 which come into engagement with and are retained by the dovetail grooves 22 of the retention body 17 as in the case of the first magnetic-pole members 15 and the first magnetic-pole members 16.

Figure 13:
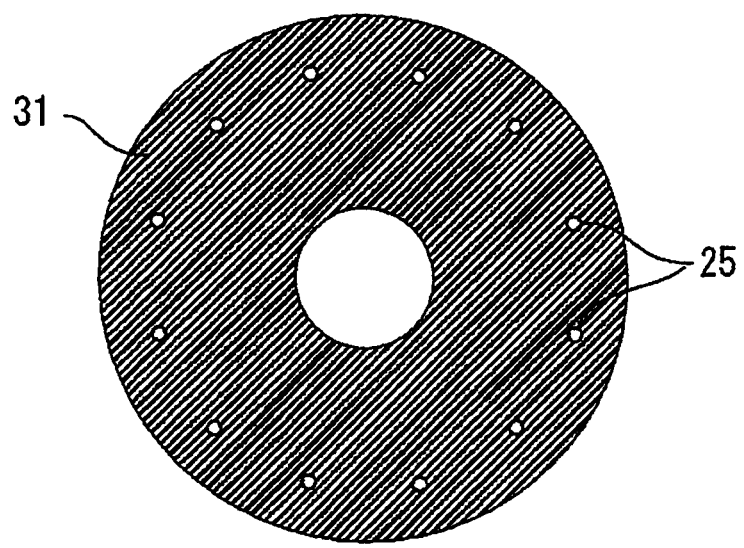
FIG. 13 A sectional view illustrating a first magnetic end plate of the rotor of the Lundell type rotating machine, corresponding to the line XIII-XIII of FIG. 10.
Figure 17:
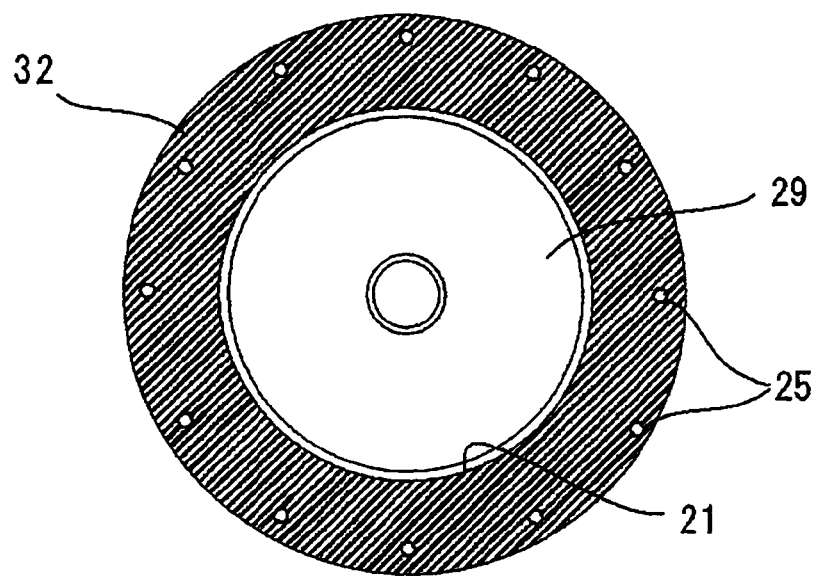
FIG. 17 A sectional view illustrating the relationship between a second magnetic end plate and a magnetic base of the rotor of the Lundell type rotating machine, corresponding to the line XVII-XVII of FIG. 10.
Figure 18:
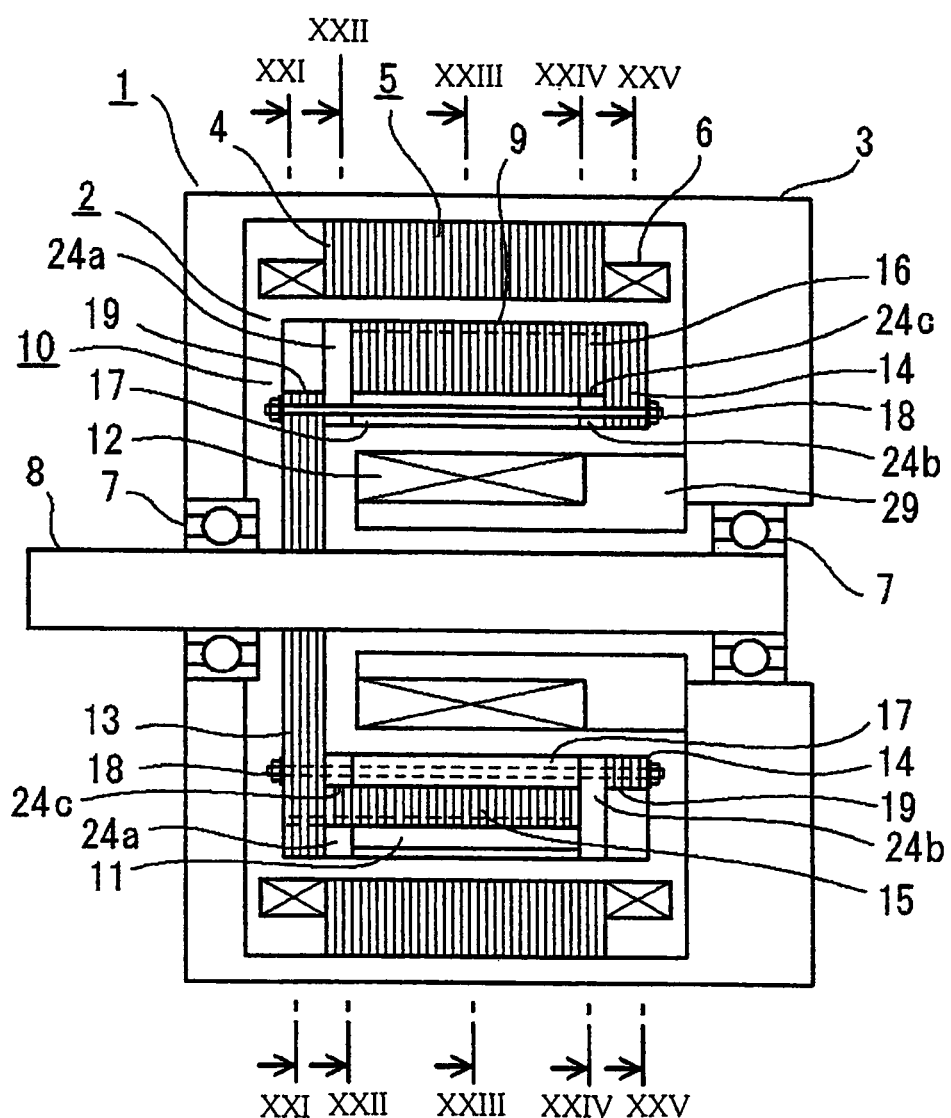
FIG. 18 A view illustrating a Lundell type rotating machine according to a fourth embodiment of the present invention, which is a schematic sectional view taken along the line XVIII-XVIII of FIG. 23.
Figure 19:
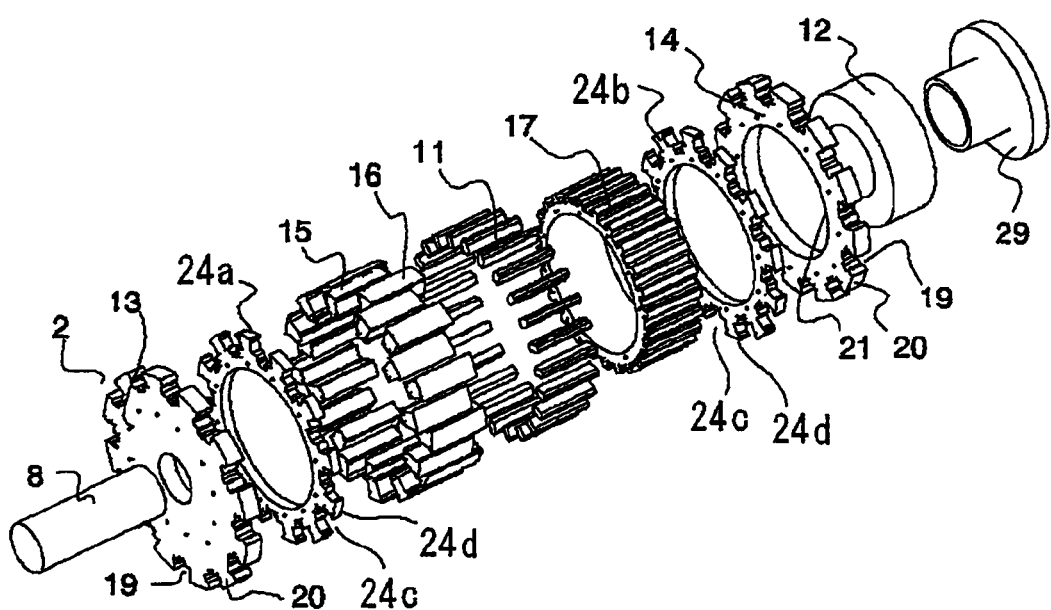
FIG. 19 A schematic exploded perspective view of a rotor of the Lundell type rotating machine illustrated in FIG. 18.

As illustrated in FIGS. 13 and 17, each of the first magnetic end plate 31 and the second magnetic end plate 32 of this Lundell type rotating machine has a circular outer circumferential edge without concave portions in the outer circumferential portion. The reason is that the magnetic flux can be prevented from leaking to the first magnetic end plate 31 and the second magnetic end plate 32 because the permanent magnets 33 are provided to the distal end portions of the first magnetic-pole members 15 and the second magnetic-pole members 16. Accordingly, the notches 19 as illustrated in FIGS. 4 and 8 are not required to be provided. The remaining configuration is the same as that illustrated in FIGS. 1 to 8.

According to the configuration described above, a magnet surface area can be increased. A magnetic flux amount is a product of a density of generated magnetic flux and the magnet surface area. Therefore, the same magnetic flux amount can be obtained by using an inexpensive ferrite magnet or Nd—Fe—B bond magnet in place of an expensive sintered rare-earth magnet. Moreover, the ferrite magnet and the Nd—Fe—B bond magnet have a high internal resistance, and therefore the eddy current is less liable to flow therethrough. Thus, a loss due to the eddy current inside the magnet, which is generated by a change in the amount of generated magnetic field passing through the magnet portions, is small. As a result, the efficiency of the Lundell type rotating machine can be enhanced.

Figure 14:
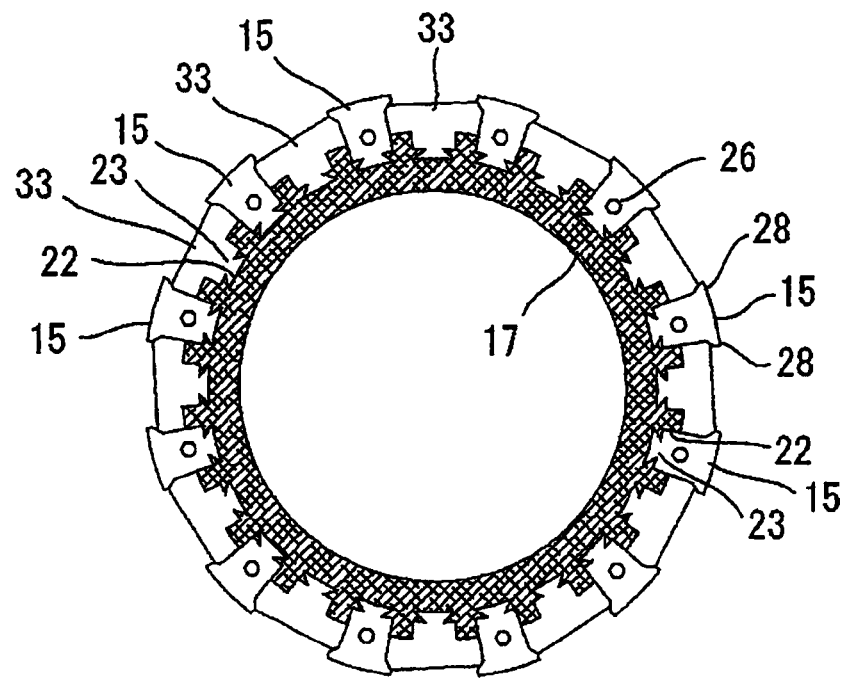
FIG. 14 A sectional view illustrating the relationship among a retention body, first magnetic-pole members, and third magnetic-pole members of the rotor of the Lundell type rotating machine, corresponding to the line XIV-XIV of FIG. 10.
Figure 15:
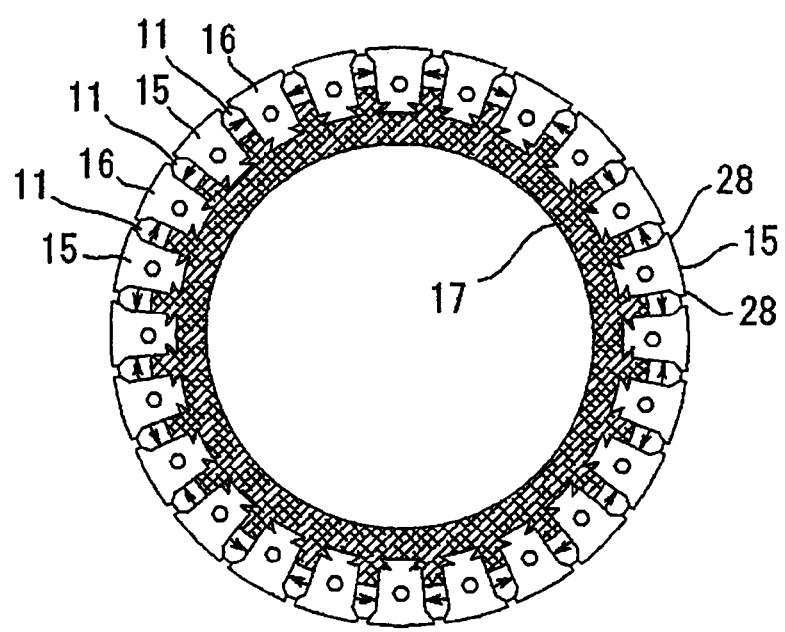
FIG. 15 A sectional view illustrating the relationship among the retention body, the first magnetic-pole members, and permanent magnets of the rotor of the Lundell type rotating machine, corresponding to the line XV-XV of FIG. 10.
Figure 16:
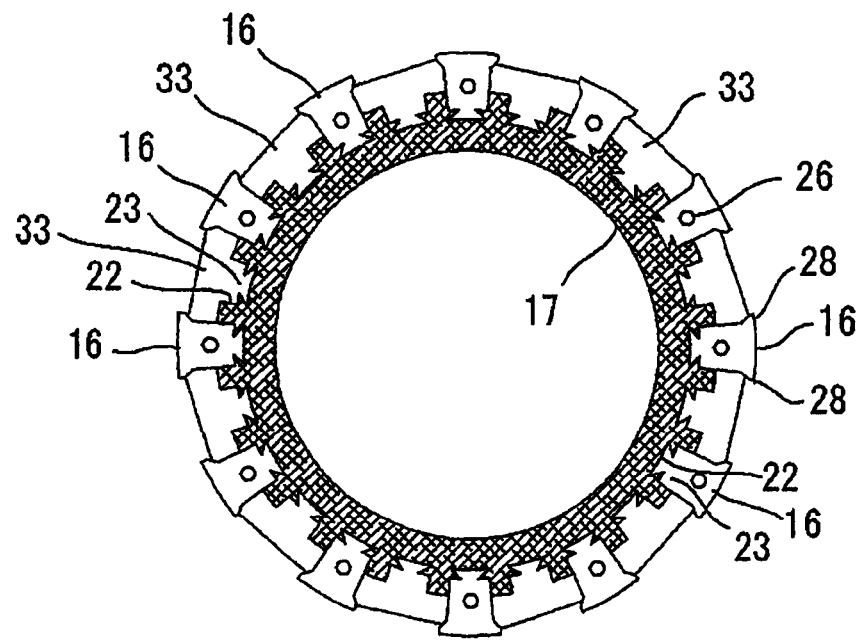
FIG. 16 A sectional view illustrating the relationship among the retention body, second magnetic-pole members, and fourth magnetic-pole members of the rotor of the Lundell type rotating machine, corresponding to the line XVI-XVI of FIG. 10.

Moreover, two surfaces of each of the permanent magnets 33, which are oriented in the axial direction, are supported by the first magnetic end plate 31 or the second magnetic end plate 32, and the distal ends of the first magnetic-pole members 15 and the second magnetic-pole members 16. Two end surfaces of each of the permanent magnets 33, which are oriented in the circumferential direction, are supported by the side surfaces of the first magnetic-pole members 15 and the second magnetic-pole members 16. A radially inner surface of each of the permanent magnets 33 is supported by an outer circumferential surface of the retention body 17 as illustrated in FIGS. 14 and 16. Further, the dovetails 23 are brought into engagement with the dovetail grooves 22 provided on the outer circumferential surface of the retention body 17 so as to radially support the permanent magnets 33. In this manner, the permanent magnets 33 are supported not by an independent special mechanism which is newly prepared but by the components required for the configuration of the rotor iron core 10. Therefore, the Lundell type rotating machine can be configured at low cost with excellent mass productivity without the need of fabricating new components.

Figure 11:
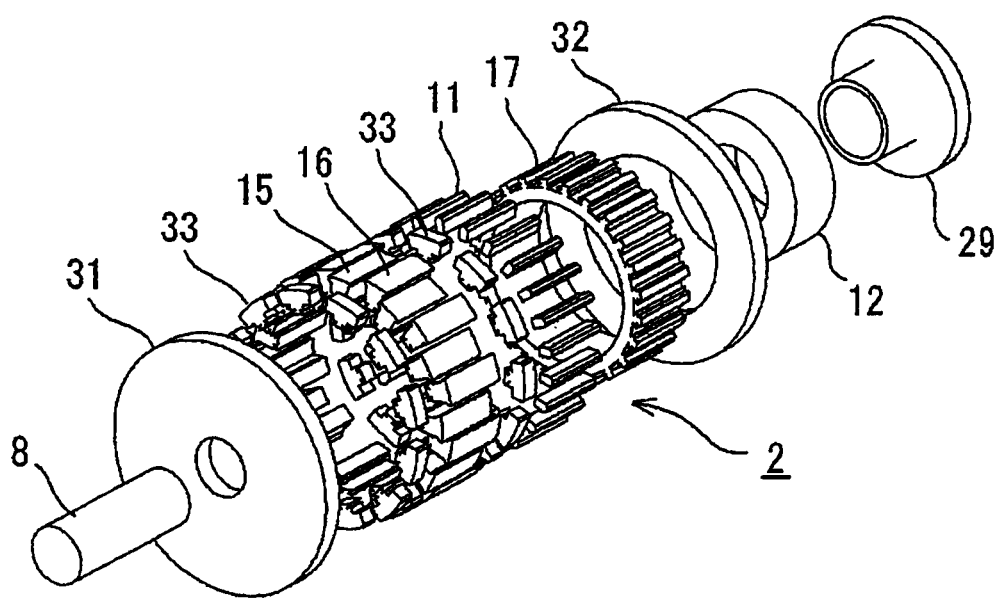
FIG. 11 A schematic exploded perspective view of a rotor of the Lundell type rotating machine illustrated in FIG. 10.
Figure 12:
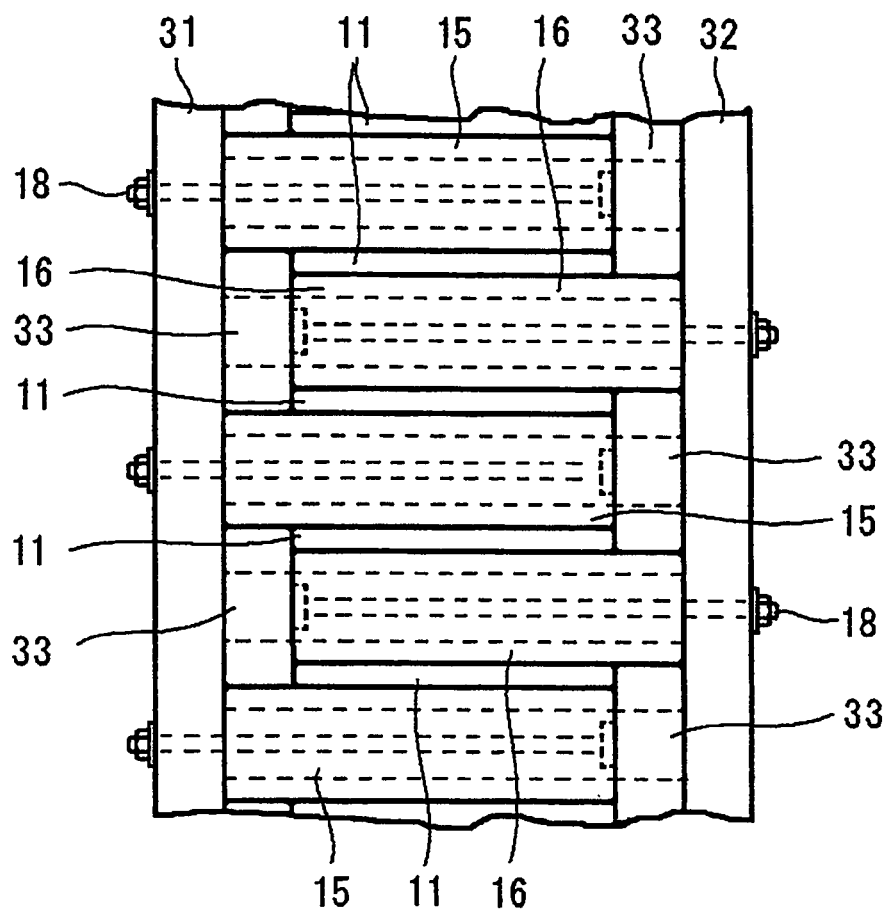
FIG. 12 A schematic development view of an outer circumferential surface of the rotor of the Lundell type rotating machine illustrated in FIG. 10.

Also in the assembly work, the mass productivity is enhanced if unidirectional assembly is possible in which the components are sequentially assembled from a farther side of the drawing sheet of FIG. 11 to a closer side thereof. Even in such a case, the permanent magnets 33, the first magnetic-pole members 15 and the second magnetic-pole members 16, the permanent magnets 11, and the permanent magnets 33 can be inserted into the common dovetail grooves 22 of the retention body 17 in the stated order. Accordingly, a shape of the processed cross section of the non-magnetic retention body 17 may be simple. Therefore, a structure of the components can be simplified. Further, the unidirectional assembly can be facilitated which can enhance the mass productivity.

The Lundell type rotating machine as described above has a rigid structure against the centrifugal force even when increased in size. Moreover, the rigid magnet retention structure can be provided to reduce the magnetic saturation of the rotor iron core with the efficient magnetic path configuration. Further, due to the rigid mechanical retention, the amount of the magnets to be mounted can be increased. Thus, in addition to the improvement of the magnetic efficiency described above, a remarkable magnetic-saturation reducing effect can be obtained even with the relatively inexpensive bond type magnet or ferrite magnet. Accordingly, the Lundell type rotating machine for a high-efficiency/high-output rotating machine with an output exceeding 10 kW, for example, for an electric car or a hybrid car, can be easily realized.

Embodiment 4

FIGS. 18 to 26 illustrate a Lundell type rotating machine according to a fourth embodiment of the present invention. A rotor iron core 10 of the Lundell type rotating machine of the present invention includes a first non-magnetic end plate 24a provided between a first magnetic endplate 13 and second magnetic-pole members 16 and a second non-magnetic end plate 24b provided between a second magnetic end plate 14 and first magnetic-pole members 15, in addition to the first magnetic end plate 13, the second magnetic end plate 14, the plurality of first magnetic-pole members 15, the plurality of second magnetic-pole members 16, and a non-magnetic retention body 17.

The first non-magnetic end plate 24a and the second non-magnetic end plate 24b magnetically separate the first magnetic-pole members 15 and the second magnetic end plate 14 from each other and the second magnetic-pole members 16 and the first magnetic end plate 13 from each other so as to reduce the leakage of the magnetic flux between the magnetic poles 9. In the illustrated example, each of the first non-magnetic end plate 24a and the second non-magnetic end plate 24b is an annular plate member as a whole, which is made of, for example, SOMALOY (commercial name) fabricated by Höganäs AB, and includes concave portions 24c provided in an outer circumferential portion of each of the non-magnetic end plates at equal intervals so as to be able to receive the first magnetic-pole members 15 or the second magnetic-pole members 16, and convex portions 24d formed between the concave portions 24c so as to be brought into abutment against the end surfaces of the first magnetic-pole members 15 or the second magnetic-pole members 16.

Figure 21:
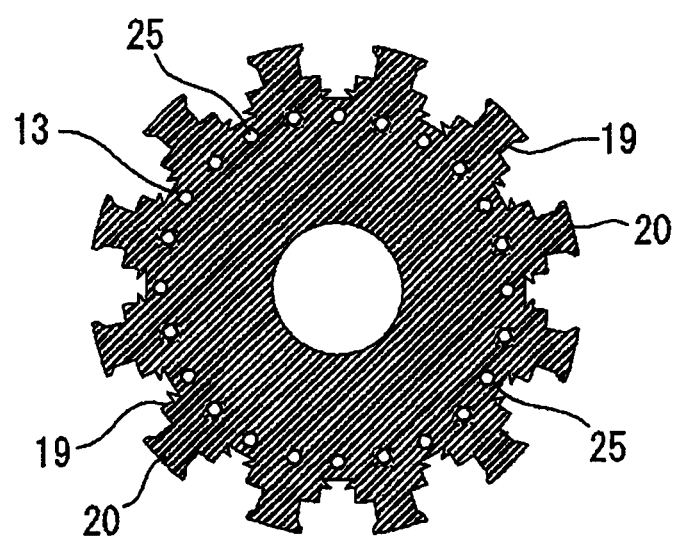
FIG. 21 A sectional view illustrating a first magnetic end plate of the rotor of the Lundell type rotating machine, corresponding to the line XXI-XXI of FIG. 18.
Figure 25:
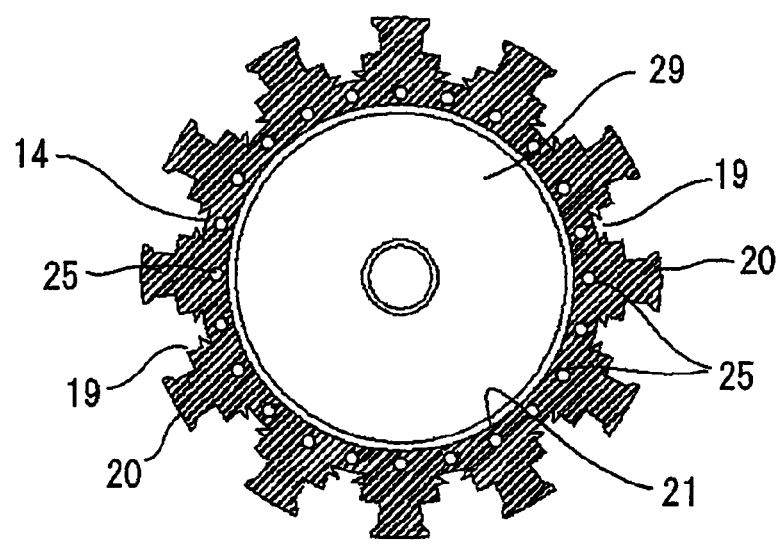
FIG. 25 A sectional view illustrating a second magnetic end plate of the rotor of the Lundell type rotating machine, corresponding to the line XXV-XXV of FIG. 18.

As can be seen from a planar shape illustrated in FIG. 21, notches 19 are provided in an outer circumferential edge portion of the first magnetic endplate 13. Between the notches 19, convex portions 20 are formed in a number corresponding to the number of the stator magnetic poles 4. Bolt holes 25 for receiving fastening bolts 18 corresponding to through bolts are provided. A planar shape of the second magnetic end plate 14, as illustrated in FIG. 25, is similar to that of the first magnetic end plate 13 in that the notches 19 and the convex portions 20 are provided. However, phases are shifted so that the notches 19 and the convex portions 20 correspond to each other in the axial direction. Moreover, the second magnetic end plate has an inner circumferential edge 21 having a larger diameter than that in the case of the first magnetic end plate 13. Similarly to the first magnetic end plate 13, the bolt holes 25 for receiving the fastening bolts 18 are provided to the second magnetic end plate 14.

Figure 22:
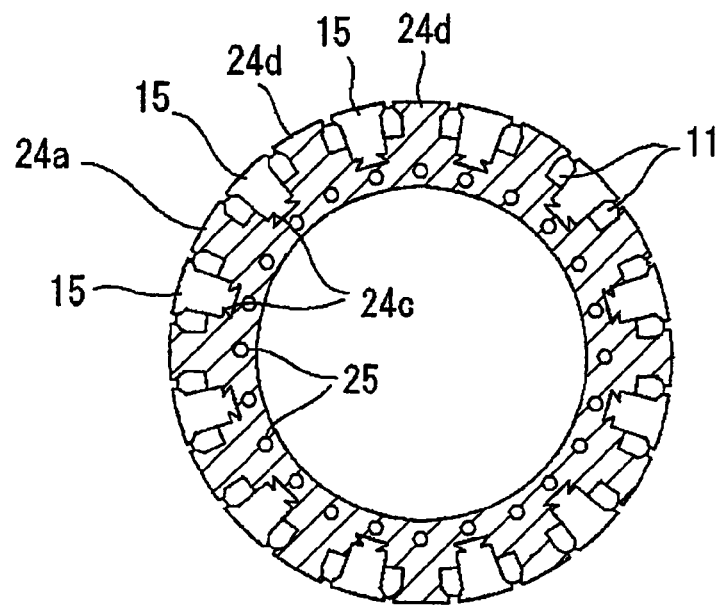
FIG. 22 A sectional view illustrating a non-magnetic end plate and first magnetic-pole members of the rotor of the Lundell type rotating machine, corresponding to the line XXII-XXII of FIG. 18.
Figure 23:
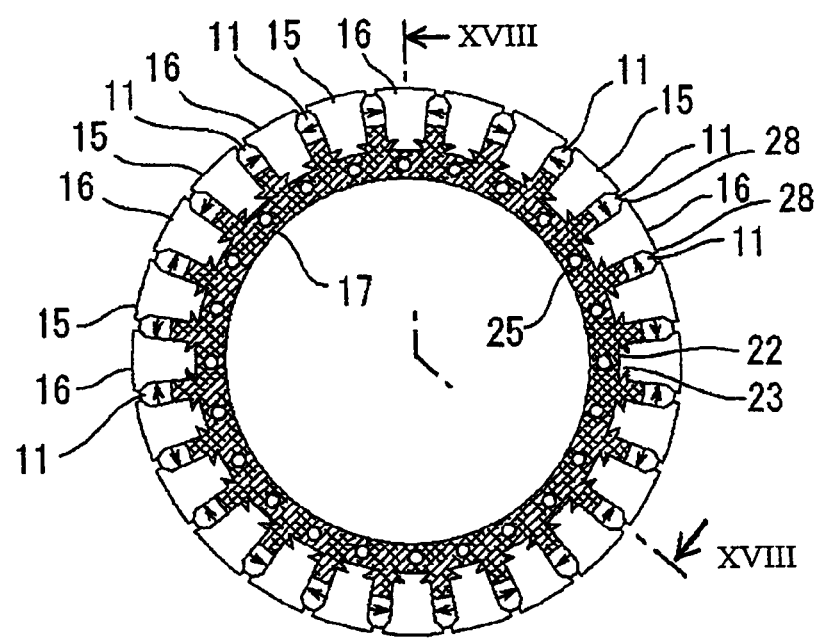
FIG. 23 A sectional view illustrating the relationship among a retention body, first magnetic-pole members, second magnetic-pole members, and permanent magnets of the rotor of the Lundell type rotating machine, corresponding to the line XXIII-XXIII of FIG. 18.
Figure 24:
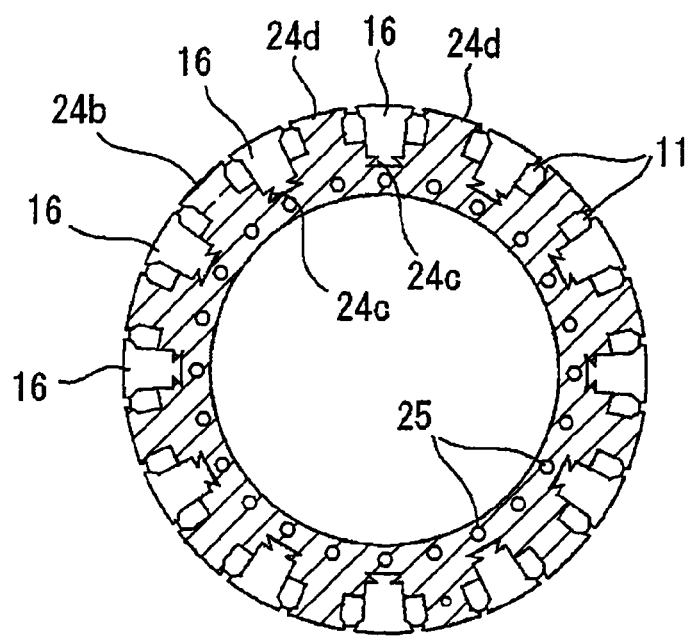
FIG. 24 A sectional view illustrating the relationship between the non-magnetic end plate and the second magnetic-pole members of the rotor of the Lundell type rotating machine, corresponding to the line XXIV-XXIV of FIG. 18.

Between the first magnetic end plate 13 and the second magnetic end plate 14, the retention body 17, which has the substantially hollow cylindrical shape as illustrated in FIG. 23 and which has dovetail grooves 22 extending in the axial direction provided in an outer circumferential portion of the retention body 17, is provided through an intermediation of the first non-magnetic end plate 24a illustrated in FIG. 22 and the second non-magnetic end plate 24b illustrated in FIG. 24. Dovetails 23 of the first magnetic-pole members 15 and the second magnetic-pole members 16 corresponding to the laminates of a large number of magnetic plates, each having a planar shape as illustrated in FIG. 23, are inserted into the dovetail grooves 22 so as to fix the first magnetic-pole members 15 and the second magnetic-pole members 16 in the radial direction and the circumferential direction. Also, to the retention body 17, the bolt holes 25 passing in the axial direction therethrough are provided.

Figure 20:
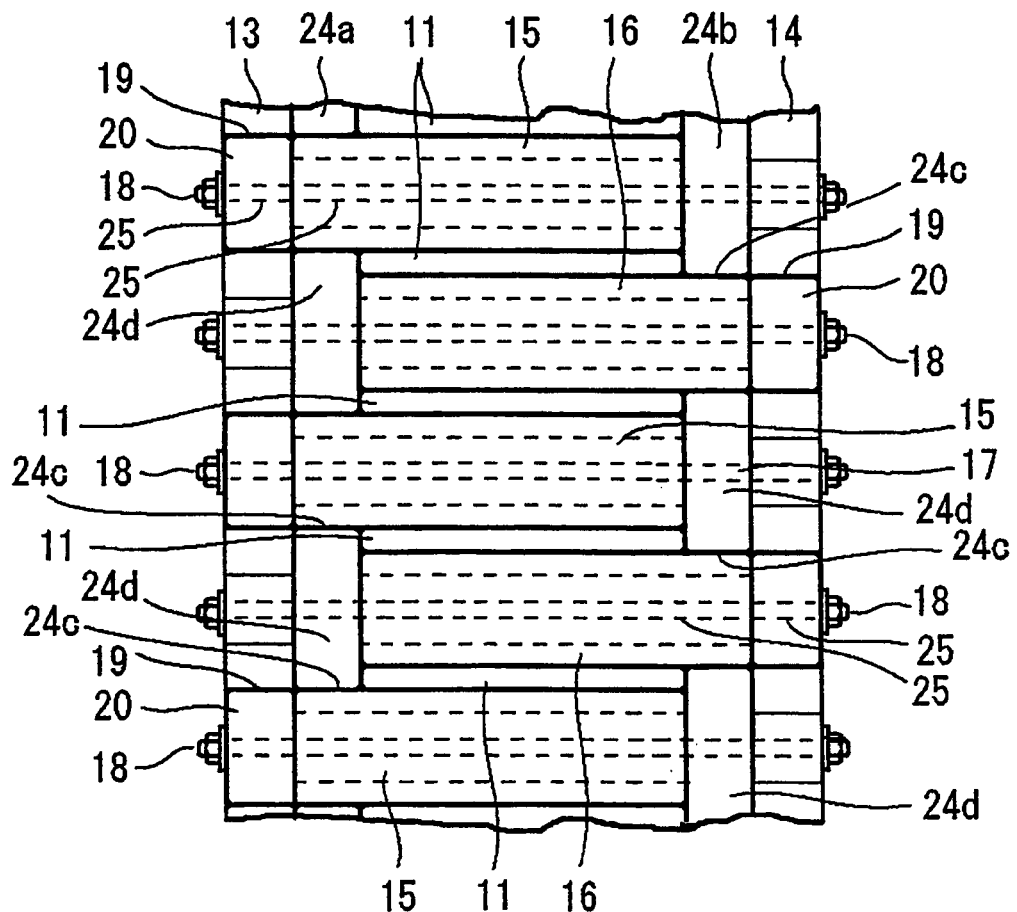
FIG. 20 A schematic development view of an outer circumferential surface of the rotor of the Lundell type rotating machine illustrated in FIG. 18.

As is most clearly illustrated in FIG. 20, one end (left end in FIG. 3) of each of the first magnetic-pole members 15 passes through the concave portion 24c of the first non-magnetic end plate 24a so as to come into direct abutment against the first magnetic end plate 13, whereas another end (right end in FIG. 3) thereof extends in the axial direction toward the second magnetic end plate 14 so as to abut against the convex portion 24d of the second non-magnetic end plate 24b. The distal end of each of the first magnetic-pole members 15 and the second magnetic end plate 14 are magnetically blocked from each other by the convex portion 24d of the second non-magnetic end plate 24b. Similarly, although the orientation is opposite for each of the second magnetic-pole members 16, one end (right end in FIG. 3) thereof comes into direct abutment against the second magnetic end plate 14, whereas another end (left end in FIG. 3) thereof extends in the axial direction toward the first magnetic end plate 13 so as to abut against the convex portion 24d of the non-magnetic end plate 24a. The distal end of the second magnetic-pole members 16 and the first magnetic end plate 13 are magnetically blocked from each other by the convex portion 24d of the first non-magnetic end plate 24a. In order to axially fix the first magnetic-pole members 15 and the second magnetic-pole members 16 corresponding to the laminates, the fastening bolts 18 extending so as to pass through the retention body 17 are inserted into the bolt holes 25 of the first magnetic end plate 13 and the second magnetic end plate 14 and into the bolt holes 25 of the first non-magnetic end plate 24a and the second magnetic end plate 24b, to be fastened to the first magnetic end plate 13 and the second magnetic end plate 14.

The first magnetic-pole members 15 and the second magnetic-pole members 16 arranged in parallel to each other in the axial direction and alternately in the circumferential direction as described above are supported in the radial direction and the circumferential direction by the contact of the side surfaces with the permanent magnets 11 and the engagement of the dovetails 23 with the dovetail grooves 22 of the retention body 17, and are also supported in the axial direction by being interposed between the first magnetic end plate 13 and the second magnetic end plate 14 by the fastening bolts 18. The first non-magnetic end plate 24a is supported in the axial direction between the first magnetic end plate 13 and the second magnetic end plate 16, and is supported in the radial direction and the circumferential direction by the first magnetic-pole members 15 fitted into the concave portions 24c and the fastening bolts 18. Moreover, the second non-magnetic endplate 24b is supported in the axial direction between the second magnetic end plate 14 and the first magnetic-pole members 15, and is supported in the radial direction and the circumferential direction by the second magnetic-pole members 16 fitted into the concave portions 24c, and the fastening bolts 18. The first magnetic-pole members 15 and second magnetic-pole members 16 thus supported are combined with each other so as to extend from the opposite sides in the axial direction to allow the distal end portions thereof to come into meshing engagement with each other, thereby constituting the Lundell type magnetic iron core.

As illustrated in FIGS. 20 and 23, voids extending in the axial direction are formed between circumferential side surfaces of the first magnetic-pole members 15 and the second magnetic-pole members 16. In the voids, the permanent magnets 11 are inserted and retained. Specifically, peaked portions 28 are formed at radially outer corners of the first magnetic-pole members 15 and the second magnetic-pole members 16. When the first magnetic-pole members 15 and the second magnetic-pole members 16 are brought into engagement with the retention body 17, each of the voids between the side surfaces of the first magnetic-pole members 15 and the second magnetic-pole members 16 and the outer circumferential surface of the retention body 17 is formed so that a width on the inner side is large and a width on the outer side is narrowed by the peaked portions 28. Therefore, the permanent magnets 11 inserted into the voids are supported by direct contact with the side surfaces of the first magnetic-pole members 15 and the second magnetic-pole members 16, and are locked by the peaked portions 28 so as not to be removable in the radial direction.

The permanent magnets 11 directly abut against the first magnetic-pole members 15 and the second magnetic-pole members 16 as described above. Therefore, even with the ferrite magnets having a small magnetic gap, which is relatively inexpensive, the magnetic-saturation reducing effect by the magnets can be enhanced. As a result, a reduction in output due to magnetic saturation of the rotor is reduced even when a large field magnetomotive force is applied to the field coil. Therefore, a motor with a high torque can be obtained. The remaining configuration is the same as that of the first embodiment.

As described above, the first magnetic-pole members 15 supported by directly abutting against the first magnetic end plate 13 firmly fixed onto the rotating shaft 8 and the second magnetic-pole members 16 supported by directly abutting against the second magnetic end plate 14 having the inner circumferential edge 21 arranged apart from the rotating shaft 8 are each supported by the engagement of the dovetails 23 with the dovetail grooves 22 formed on the outer circumference of the retention body 17 over the entire axial length thereof. Moreover, the permanent magnets 11 supported between the first magnetic-pole members 15 and the second magnetic-pole members 16 are supported by the first magnetic-pole members 15, the second magnetic-pole members 16, and the retention body 17 over substantially the entire lengths of the permanent magnets 11. Therefore, the rotor iron core 10 becomes an assembly having high rigidity as a whole. Even when an axial size of the rotor iron core 10 is large, a sufficient mechanical strength can be obtained. Moreover, the rotor iron core 10 includes the first magnetic end plate 13 and the second magnetic end plate 14, which are independent of each other, and the first magnetic-pole members 15, the second magnetic-pole members 16, and the retention body 17 having the dovetail grooves 22 for assembly. Therefore, fabrication and assembly of the rotor iron core 10 are easy. Further, the rotor iron core 10 is formed of the laminate of the magnetic plates. Therefore, an eddy current loss inside a magnetic body for axial magnetic linkage, which is generated by a fluctuation in magnetic flux passing through the inside of the magnetic body for axial magnetic linkage, is eliminated.

In the illustrated example, the field coil 12 is supported by the magnetic base 29 fixed to the frame body 3 of the stator 1 so that the magnetic flux generated by the field coil 12 passes through the magnetic base 29, the first magnetic end plate 13, the first magnetic-pole members 15, the second magnetic-pole members 16, the stator magnetic poles 4, and the second magnetic endplate 14, to thereby allow the field coil 12 to be magnetically coupled to the rotor iron core 10 through the voids. Therefore, a complicated mechanism for supplying electric power to the field coil 12, such as a slip ring, is not required. The field coil 12 may also be fixed to the rotor iron core 10 side. The magnetic base 29 may be the massive iron core. However, with use of the pressurized-powder iron core (for example, SOMALOY (commercial name) fabricated by Höganäs AB or the like), the eddy current inside the rotor can be suppressed when the stator magnetic fluxes interlink or when the magnetic flux of the field coil is changed. Therefore, the efficiency of the Lundell type rotating machine can be further enhanced.

The notches 19 and the convex portions 20 are formed in the outer peripheral edge portions of the first magnetic end plate 13 and the second magnetic end plate 14. As illustrated in FIGS. 5 to 7, a shape of the notches 19 is substantially identical, which is the same as or slightly larger than an outer profile of each of concave portions formed in a state in which the first magnetic-pole members 15 or the second magnetic-pole members 16 are alternately inserted into the dovetail grooves 22 of the retention body 17. The notches 19 are provided so as to correspond to the positions obtained by extending the dovetail grooves 22 of the retention body 17 in the axial direction. Therefore, at the time of assembly of the rotor 2, the components can be sequentially inserted in the axial direction and assembled. Thus, assembly work is easy.

Figure 26:
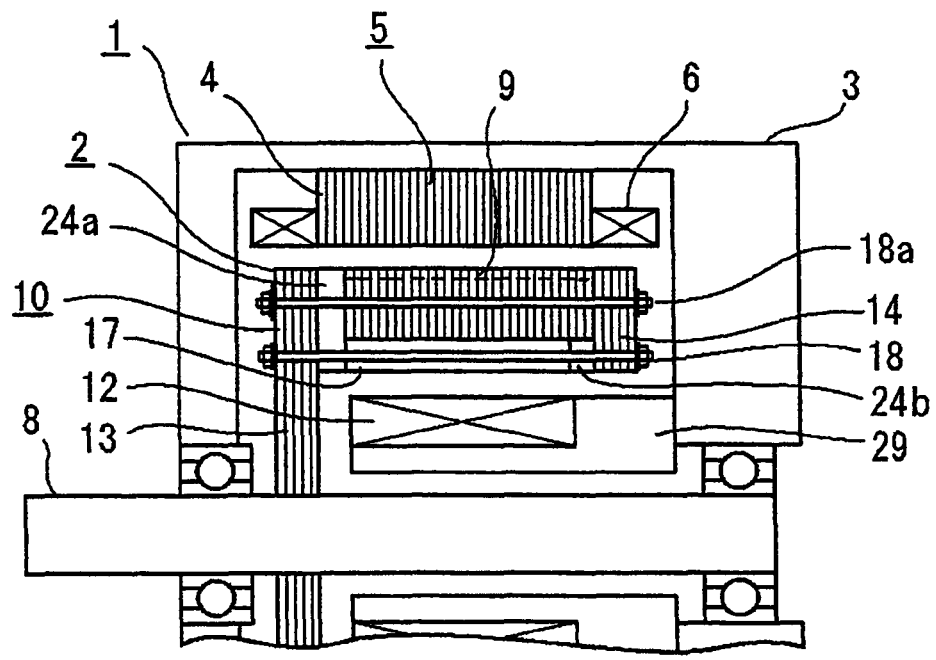
FIG. 26 A schematic sectional view illustrating another example of the rotor of the Lundell type rotating machine according to the fourth embodiment of the present invention.

In the fourth embodiment, as illustrated in FIG. 26, the first magnetic end plate 13, the first magnetic-pole members 15, the second non-magnetic end plate 24b, and the second magnetic end plate 14 may be all fastened by fastening bolts 18a, whereas the first magnetic end plate 13, the second magnetic-pole members 16, the first non-magnetic end plate 24a, and the second magnetic end plate 14 may be all fastened by the fastening bolts 18a. In this manner, the assembly of the rotor is facilitated, while the effect of increasing a rigidity of the rotor is obtained. In this case, the fastening bolts 18 provided so as to pass through the retention body 17 may be left as illustrated in FIG. 26 so as to be used together with the fastening bolts 18a, or may be removed. Alternatively, only the first magnetic-pole members 15 and the second magnetic-pole members 16 corresponding to the laminates may be fastened by the fastening bolts so that the fastened first magnetic-pole members 15 and second magnetic-pole members 16 are supported in the radial direction and the circumferential direction by the fitting of the dovetails to the retention body 17, and are supported in the axial direction by the first magnetic end plate 13 and the second magnetic end plate 14.

Embodiment 5

In a Lundell type rotating machine according to a fifth embodiment of the present invention, which is illustrated in FIGS. 27 to 36, a rotor iron core 10 includes concave portions 24d of a first non-magnetic end plate 24a and of a second non-magnetic end plate 24b, provided, at an angle at which non-magnetic members are arranged, between each of a first magnetic end plate 31 and a second magnetic endplate 32 and another ends (distal end portions of magnetic poles, specifically, ends which are not coupled to the first magnetic end plate 31 or the second magnetic end plate 32) of first magnetic-pole members 15 and of second magnetic-pole members 16. The rotor iron core 10 further includes permanent magnets 33, each being long in the circumferential direction and magnetized in the axial direction, provided between the concave portions 24d of the first non-magnetic end plate 24a and of the second non-magnetic end plate 24b and each of the first magnetic end plate 31 and the second magnetic endplate 32. Specifically, the permanent magnets 33 are provided between each of the first non-magnetic end plate 24a and the second non-magnetic end plate 24b, which are arranged between the distal end portions of the first magnetic-pole members 15 and of the second magnetic-pole members 16 and each of the first magnetic end plate 13 and the second magnetic end plate 14 in the Lundell type rotating machine illustrated in FIGS. 18 to 26, and each of the first magnetic end plate 31 and the second magnetic end plate 32. Therefore, the number of the permanent magnets 33 is the same as the number of poles of the rotating machines.

In the illustrated example, as is apparent from FIGS. 27 to 29, 31, and the like, the permanent magnets 33 are long in the circumferential direction, each having a substantially rectangular parallelepiped block-like shape, have end faces 34 including side faces which come into abutment against the distal end portions of the first magnetic-pole members 15 and the second magnetic-pole members 16, and have dovetails 35 which can be fixed to the rotor 2. The dovetails 35 are fitted into dovetail grooves 37 provided on an outer circumferential surface of an annular retention ring 36 provided between the first magnetic end plate 31 and the first non-magnetic end plate 24a to be supported by the fastening bolts 18 on the first magnetic end plate 31 side. Also on the second magnetic end plate 32 side, the permanent magnets 33 are supported by a similar retention ring 36.

Figure 30:
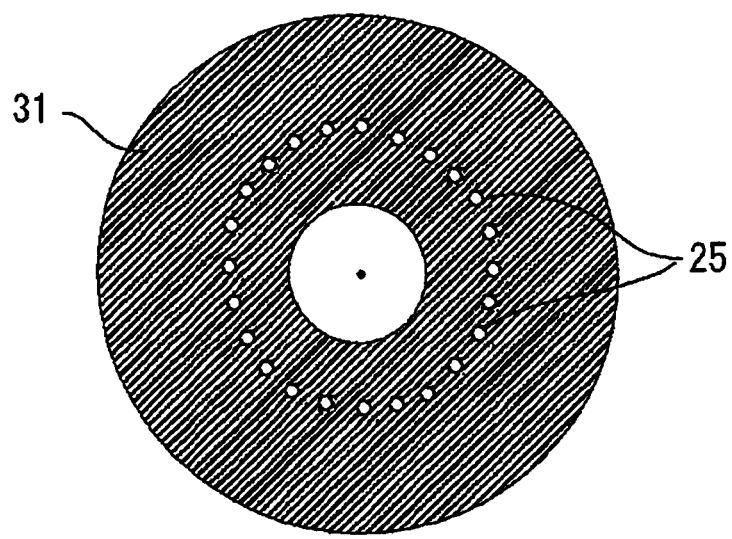
FIG. 30 A sectional view illustrating a first magnetic end plate of the rotor of the Lundell type rotating machine, corresponding to a line XXX-XXX of FIG. 27.
Figure 36:
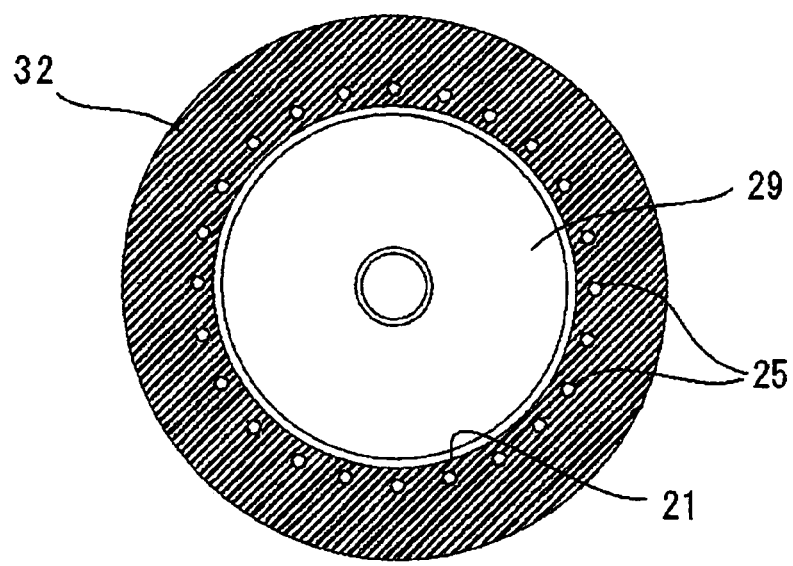
FIG. 36 A sectional view illustrating a second magnetic end plate of the rotor of the Lundell type rotating machine, corresponding to the line XXXVI-XXXVI of FIG. 27.

As illustrated in FIGS. 30 and 36, each of the first magnetic end plate 31 and the second magnetic end plate 32 of this Lundell type rotating machine has a circular outer circumferential edge without concave portions in the outer circumferential portions. The reason is that the magnetic flux can be prevented from leaking to the first magnetic end plate 31 because the first non-magnetic endplate 24a and the permanent magnets 33 are provided to the distal end portions of the second magnetic-pole members 16, and can be prevented from leaking to the second magnetic end plate 32 because the second non-magnetic end plate 24b and the permanent magnets 33 are provided to the distal end portions of the first magnetic-pole members 15. Accordingly, the notches 19 as illustrated in FIGS. 21 and 25 are not required to be provided.

Figure 31:
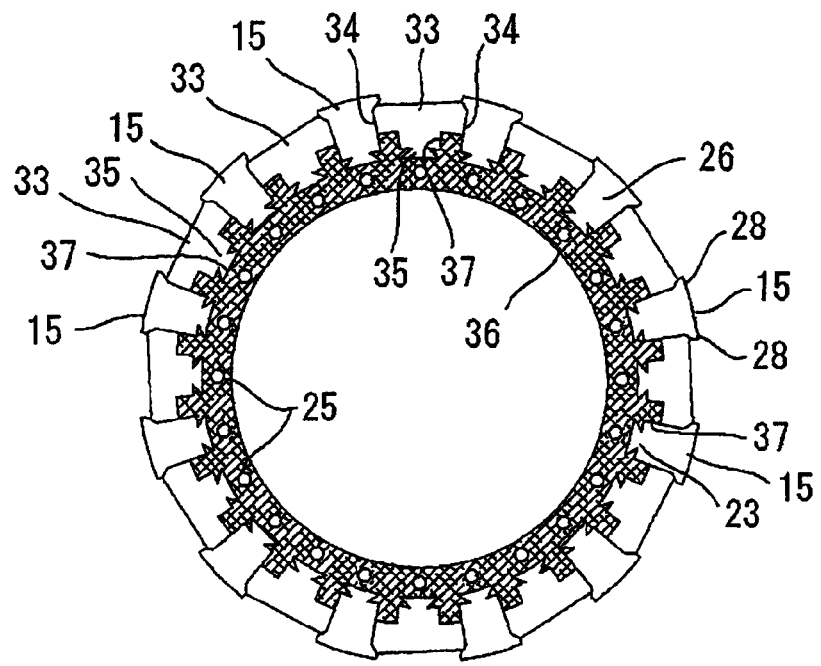
FIG. 31 A sectional view illustrating the relationship among a retention ring, first magnetic-pole members, and third magnetic-pole members of the rotor of the Lundell type rotating machine, corresponding to the line XXXI-XXXI of FIG. 27, the third magnetic-pole members corresponding to permanent magnets magnetized in an axial direction of the rotor.

FIG. 31 illustrates the retention ring 36, together with the first magnetic-pole members 15 retained by the fitting of the dovetails 23 into the dovetail grooves 37 of the retention ring 36, and the permanent magnets 33 provided between the first magnetic-pole members 15 so as to be retained by the fitting of the dovetails 35 into the dovetail grooves 37 of the retention ring 36. The retention ring 36 has the same outer shape as that of the retention body 17, and includes the bolt holes 25 for the fastening bolts 18.

Figure 32:
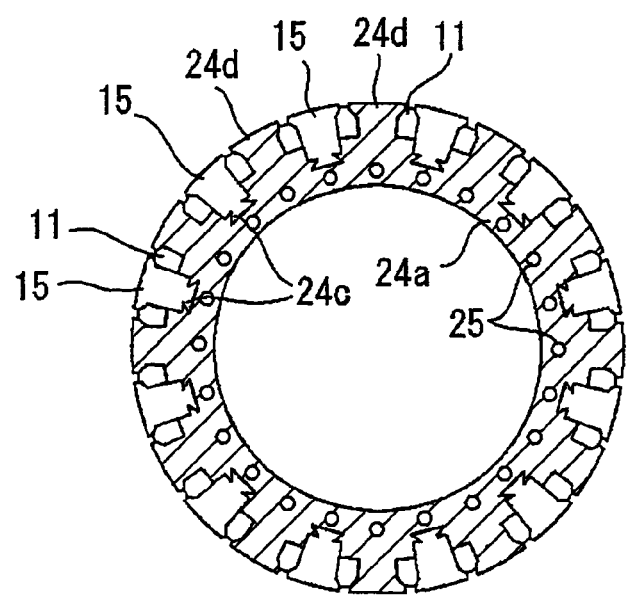
FIG. 32 A sectional view illustrating the relationship among a first non-magnetic end plate, the first magnetic-pole members, and the permanent magnets of the rotor of the Lundell type rotating machine, corresponding to the line XXXII-XXXII of FIG. 27.
Figure 33:
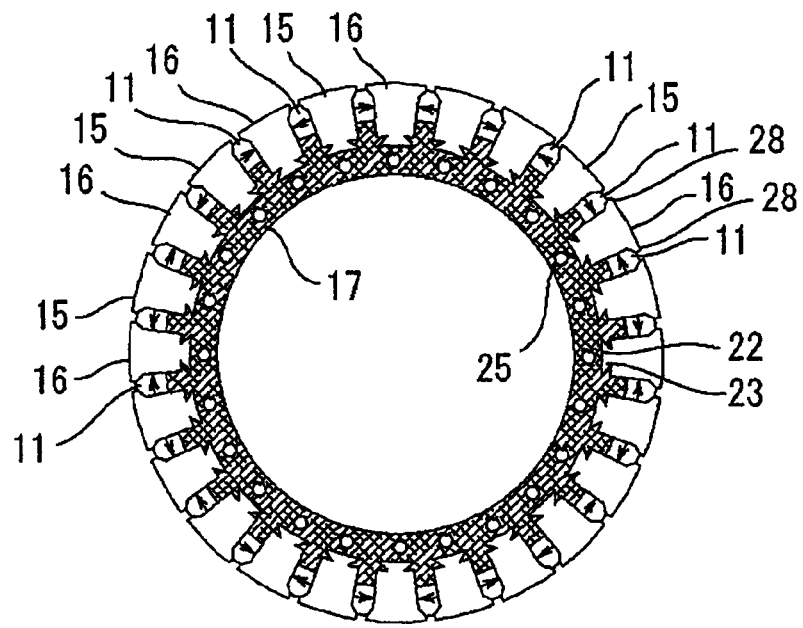
FIG. 33 A sectional view illustrating the relationship among a retention body, the first magnetic-pole members, second magnetic-pole members, and fourth magnetic-pole members of the rotor of the Lundell type rotating machine, corresponding to the line XXXIII-XXXIII of FIG. 27, the fourth magnetic-pole members corresponding to permanent magnets magnetized in the axial direction.
Figure 34:
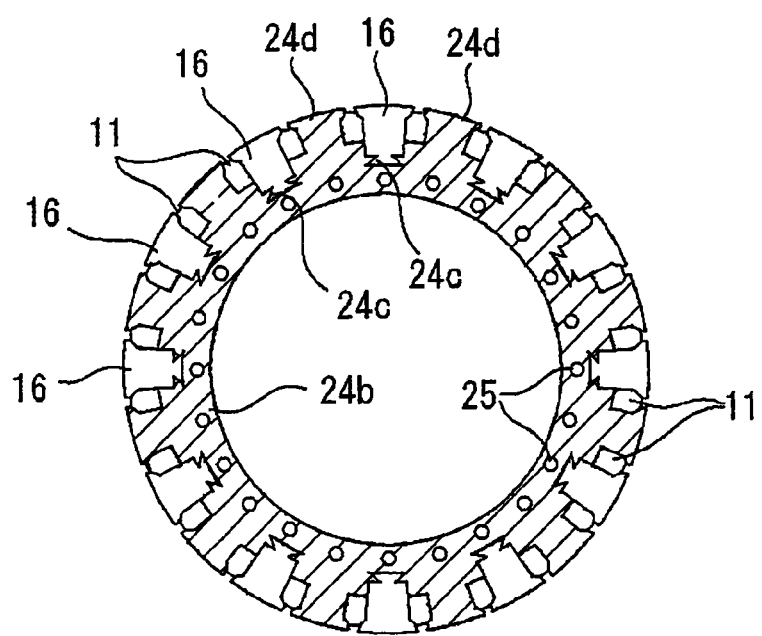
FIG. 34 A sectional view illustrating the relationship between a second non-magnetic end plate and the second magnetic-pole members of the rotor of the Lundell type rotating machine, corresponding to the line XXXIV-XXXIV of FIG. 27.
Figure 35:
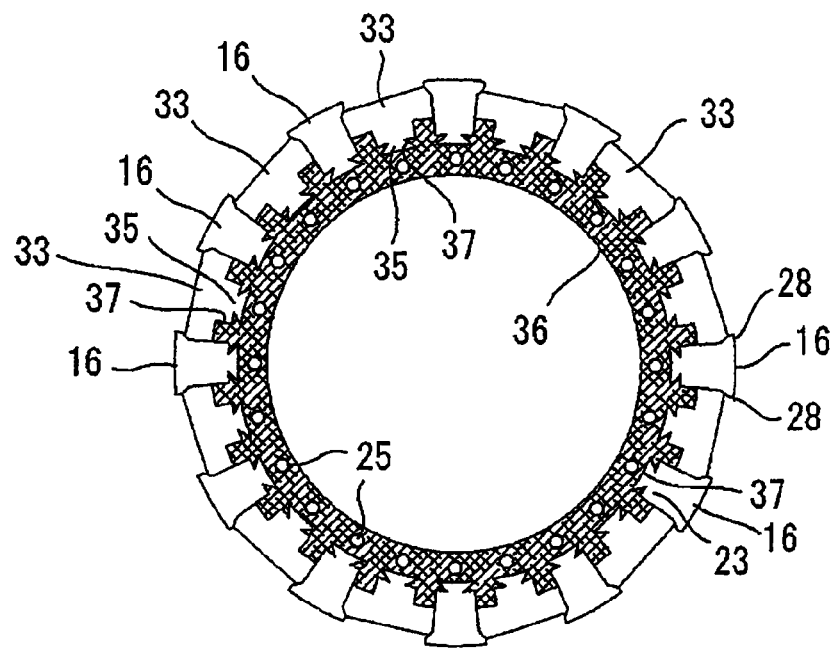
FIG. 35 A sectional view illustrating the relationship among a retention ring, the second magnetic-pole members, and the permanent magnets of the rotor of the Lundell type rotating machine, corresponding to the line XXXV-XXXV of FIG. 27.

FIG. 32 illustrates the first non-magnetic end plate 24a provided between the retention ring 36 and the retention body 17 together with the first magnetic-pole members 15 and the permanent magnets 11. FIG. 33 illustrates, together with the first magnetic-pole members 15 and the second magnetic-pole members 16 retained by the retention body 17, the permanent magnets 11 provided and retained therebetween, each being magnetized in the circumferential direction. FIG. 34 illustrates the second non-magnetic end plate 24b together with the second magnetic-pole members 16 and the permanent magnets 11 retained between the second non-magnetic end plate 24b and the second magnetic-pole members 16. FIG. 35 illustrates the retention ring 36 on the second magnetic end plate 32 side together with the second magnetic-pole members 16 and the permanent magnets 33 retained on the retention ring 36.

Figure 27:
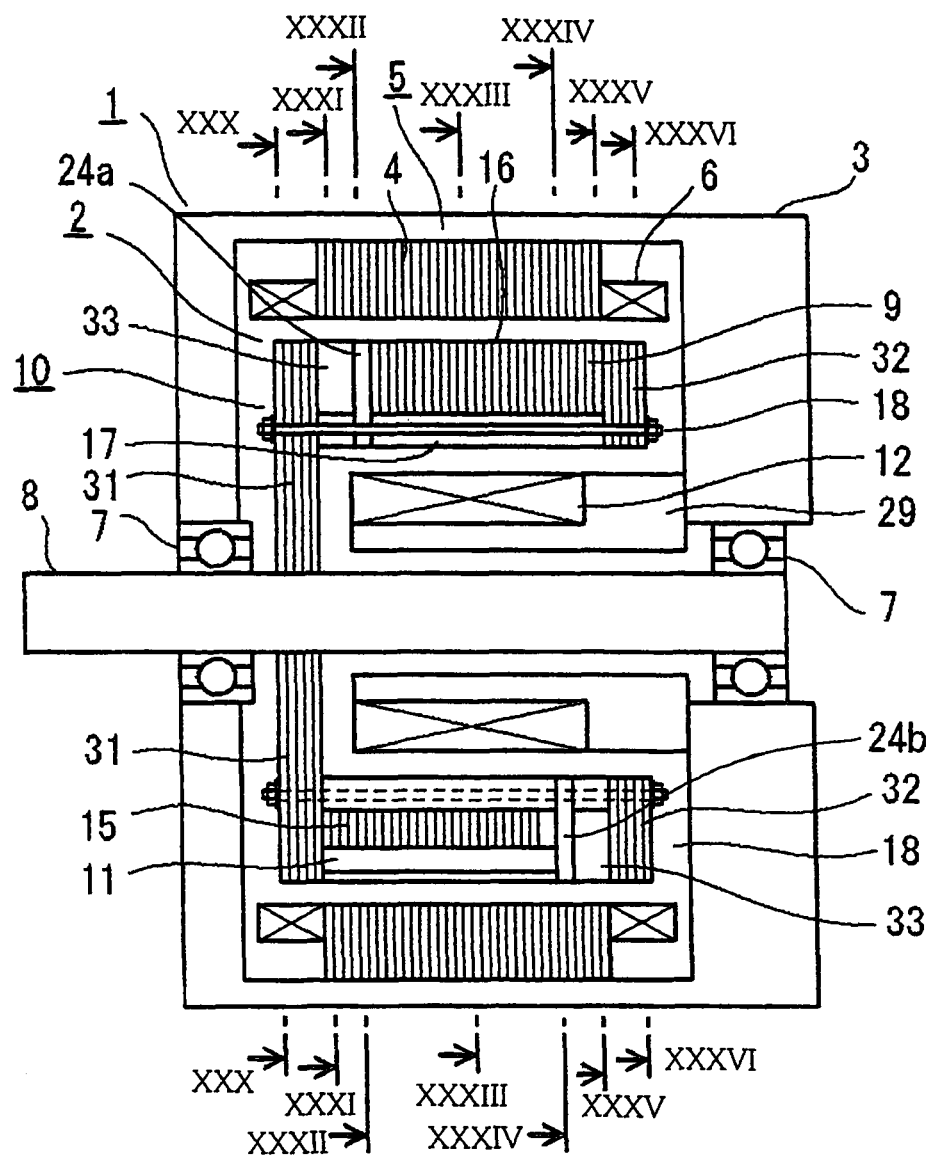
FIG. 27 A view illustrating a Lundell type rotating machine according to a fifth embodiment of the present invention, which is a schematic sectional view similar to FIG. 18.

This Lundell type rotating machine has a structure in which, as illustrated in FIG. 31, the first magnetic-pole members 15 and the permanent magnets 33 alternately appear in the circumferential direction on the retention ring 36, in a cross section taken along the line XXXI-XXXI of FIG. 27, and in which, as illustrated in FIG. 32, convex portions 24d of the first non-magnetic end plate 24a and the first magnetic-pole members 15 alternately appear in the circumferential direction in the outer circumferential portion of the first non-magnetic end plate 24, and the permanent magnets 11 are provided between the convex portions 24d and the first magnetic-pole members 15 in a cross section taken along the line XXXII-XXXII of FIG. 27. A structure similar to the above-mentioned structure but with shifted phases is also provided in a cross section taken along the line XXXIV-XXXIV and in a cross section taken along the line XXXV-XXXV of FIG. 27, as illustrated in FIGS. 34 and 35, respectively. The remaining configuration is the same as that illustrated in FIGS. 18 to 26.

According to the configuration described above, the effect of reducing the magnetic flux leakage can be enhanced by increasing a distance between the first magnetic-pole members 15 and the second magnetic end plate 32 and a distance between the second magnetic-pole members 16 and the first magnetic end plate 31. In addition, the permanent magnets 33 magnetized in the axial direction more effectively reduce the leakage of the magnetic flux from the first magnetic-pole members 15 to the second magnetic end plate 32 and the leakage of the magnetic flux from the second magnetic-pole members 16 to the first magnetic end plate 31, to thereby enable the reduction of the magnetic saturation of the magnetic poles. Moreover, the permanent magnets 33 can increase a magnet surface area. A magnetic flux amount is a product of a density of generated magnetic flux and the magnet surface area. Therefore, the same magnetic flux amount can be obtained by using an inexpensive ferrite magnet or Nd—Fe—B bond magnet in place of an expensive sintered rare-earth magnet. Moreover, the ferrite magnet and the Nd—Fe—B bond magnet have a high internal resistance, and therefore the eddy current is less liable to flow therethrough. Thus, a loss due to the eddy current inside the magnet, which is generated by a change in the amount of generated magnetic field passing through the magnet portions, is small. As a result, the efficiency of the Lundell type rotating machine can be enhanced.

Moreover, two surfaces of each of the permanent magnets 33, which are oriented in the axial direction, are supported by the first magnetic end plate 31 and the first non-magnetic end plate 24a or by the second magnetic end plate 32 and the second non-magnetic end plate 24b, whereas two end surfaces of each of the permanent magnets 33, which are oriented in the circumferential direction, are supported by the side surfaces of the first magnetic-pole members 15 and the second magnetic-pole members 16. Further, the permanent magnets 33 are radially supported by the fitting of the dovetails 35 into the dovetail grooves 37. In this manner, the permanent magnets 33 are supported not by an independent special mechanism which is newly prepared but by the components required for the configuration of the rotor iron core 10. Therefore, the Lundell type rotating machine can be configured with a small number of components at low cost with excellent mass productivity without the need of fabricating new components.

Figure 28:
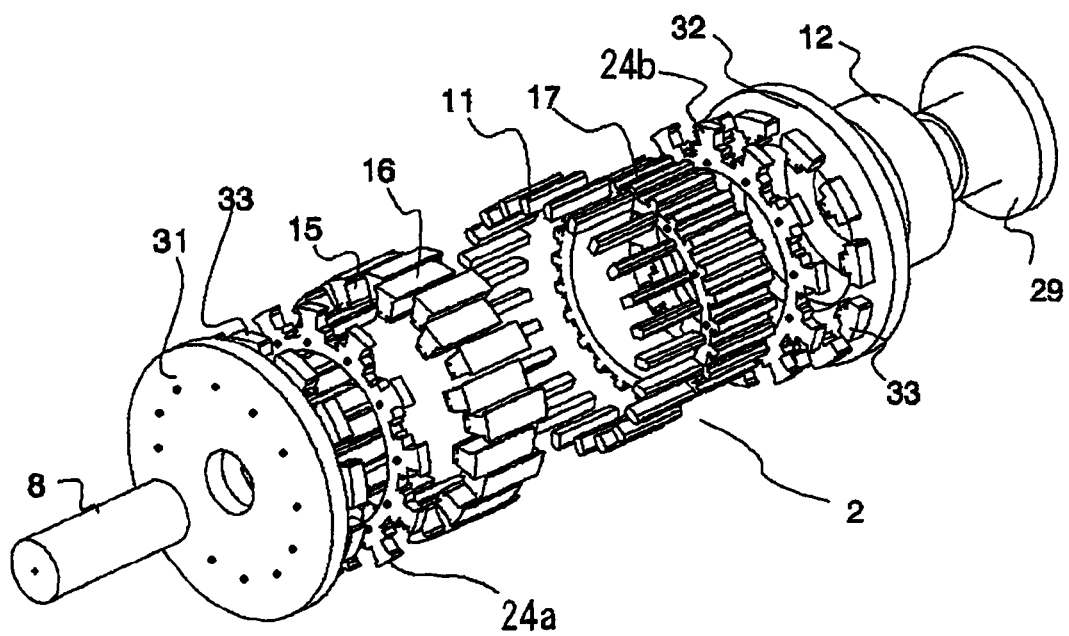
FIG. 28 A schematic exploded perspective view of a rotor of the Lundell type rotating machine illustrated in FIG. 27.
Figure 29:
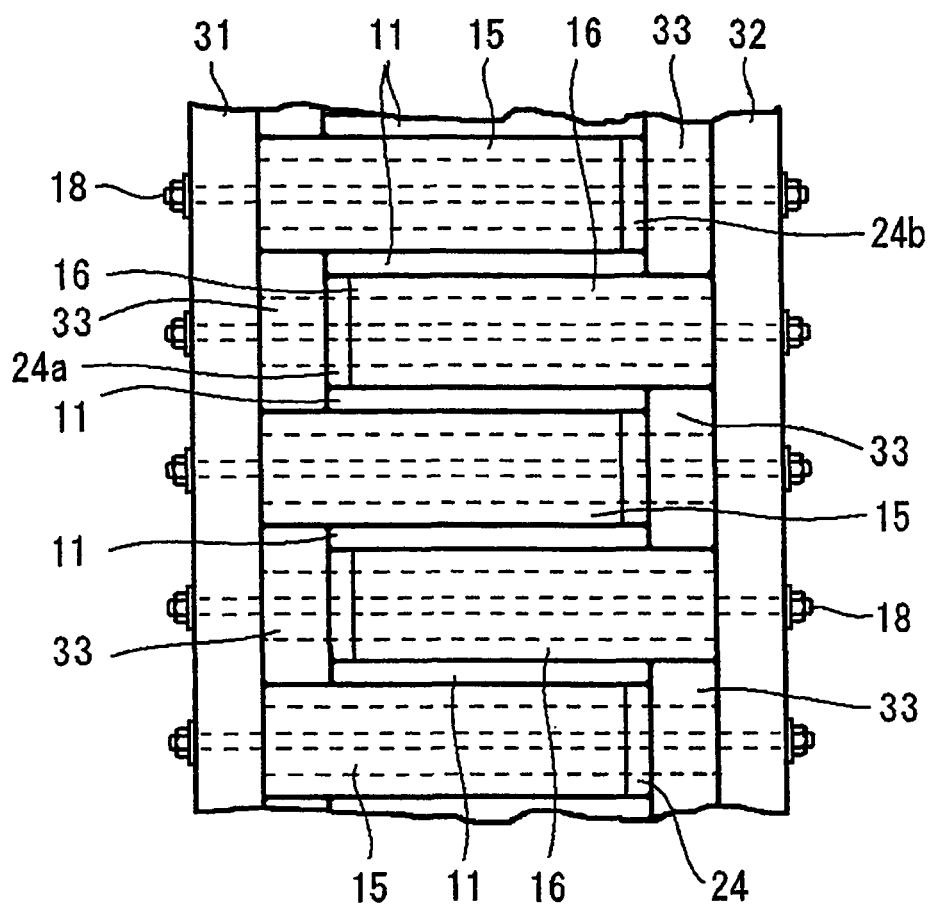
FIG. 29 A schematic development view of an outer circumferential surface of the rotor of the Lundell type rotating machine illustrated in FIG. 27.

Also in the assembly work, the mass productivity can be enhanced because unidirectional assembly can be achieved in which the components are sequentially assembled from a farther side of the drawing sheet of FIG. 28 to a closer side thereof. For example, the retention ring 36 into which the permanent magnets 33 are fitted is placed on the second magnetic end plate 32 from the closer side of the drawing sheet of FIG. 28. Further, the second non-magnetic end plate 24b and the retention body 17 are placed in the stated order on a further closer side. The dovetail grooves of the second non-magnetic endplate 24b and the dovetail grooves 22 of the retention body 17 are aligned in the axial direction. Then, the first magnetic-pole members 15, the second magnetic-pole members 16, and the permanent magnets 11 can be inserted. On an even further closer side, the retention ring 36 retaining the first non-magnetic end plate 24a and the permanent magnets 33, and the first magnetic end plate 31 are provided. Then, the entire assembly is fastened by the fastening bolts 18 corresponding to the through bolts. The fastening bolts 18 can also be inserted through the second magnetic end plate 32 in an early stage of the work so as to use as tools for the assembly work.

Embodiment 6

Figure 37:
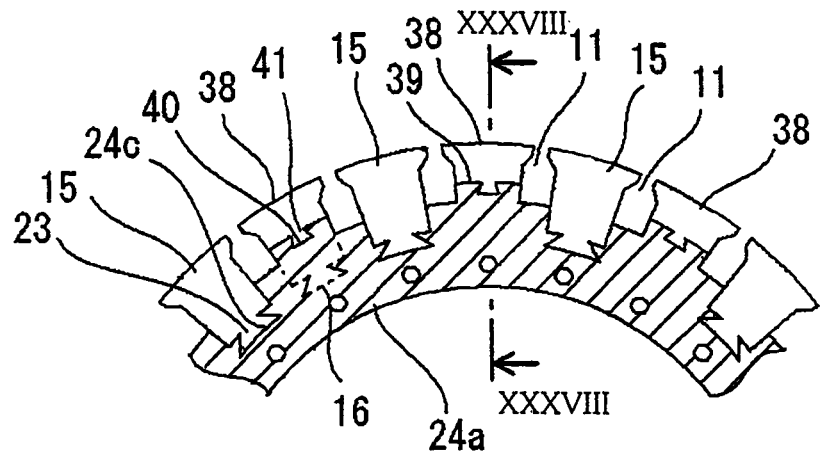
FIG. 37 A view illustrating a Lundell type rotating machine according to a sixth embodiment of the present invention, which is a sectional view illustrating the relationship among first magnetic-pole members, a non-magnetic end plate, and third magnetic-pole members at a position corresponding to a position of the line XXXII-XXXII of FIG. 27 of the fifth embodiment.
Figure 38:
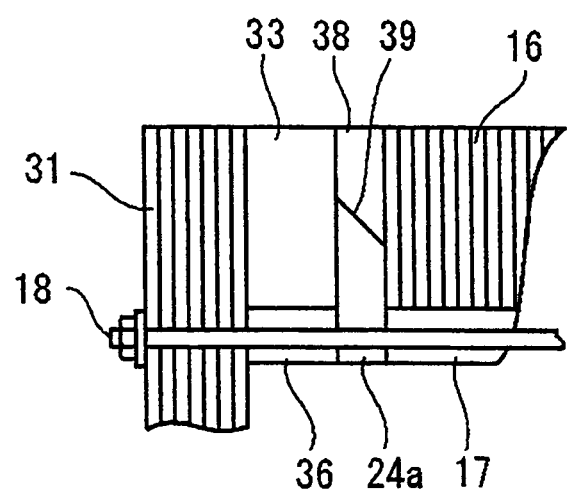
FIG. 38 A sectional view taken along the line XXXVIII-XXXVIII of FIG. 37.

In a sixth embodiment of the present invention, illustrated in FIGS. 37 and 38, third magnetic-pole members 38 corresponding to permanent magnets magnetized in the axial direction are provided in radially outer parts of portions of a first non-magnetic end plate 24a and a second non-magnetic end plate 24b, which abut against end surfaces of second magnetic-pole members 16 or first magnetic-pole members 15, that is, portions corresponding to convex portions 24d. In FIGS. 37 and 38, the third magnetic-pole members 38 which come into abutment against the end surfaces of the second magnetic-pole members 16 in the axial direction are illustrated. The third magnetic-pole members 38 and the convex portions 24d of the first non-magnetic end plate 24a complement each other to form the same outer shape as that of the second magnetic-pole members 16. A thickness of the third complemented magnetic-pole members is the same as that of the first non-magnetic endplate 24a. However, on axially inner side surfaces of the third magnetic-pole members 38, that is, on the side of abutment against the second magnetic-pole members 16, boundaries 39 between the third magnetic-pole members 38 and the first non-magnetic end plate 24a are provided at radially inner positions, and on axially outer side surfaces, that is, on the side of abutment against the first non-magnetic end plate 24a, the boundaries are provided at positions on a radially outer side with respect to the boundaries on the axially inner side surfaces. In other words, a structure in this embodiment is configured so that the axial lengths of the second magnetic-pole members 15 and 16, that is, a magnetic-pole area of a surface of a rotor iron core 10 is increased by a portion corresponding to an outer circumferential surface of the third magnetic-pole members 38. Therefore, the leakage of the magnetic flux is more effectively reduced to thereby enable the reduction of the magnetic saturation.

In the illustrated example, each of the boundaries 39 between the third magnetic-pole members 38 and the first non-magnetic end plate 24a is a tapered surface inclined with respect to a central axis of the rotating machine. On the tapered surface, a dovetail groove 40 and a dovetail 41 are formed. The dovetail groove 40 is provided in an outer circumferential portion of the first non-magnetic end plate 24a. The dovetail 41 fitted into and fixed to the dovetail groove 40 is provided to the third magnetic-pole member 38. Note that, the boundary 39 may also be formed in a step-like pattern including a plurality of cylindrical surfaces having different height in the radial direction. The remaining configuration is the same as that of the fifth embodiment.

As described above, the boundaries 39 of the third magnetic-pole members 38 with the first non-magnetic endplate 24a or the second non-magnetic end plate 24b are formed so as to be tapered or step-like in the axial direction. In this manner, the magnetic-pole area of the rotor surface can be efficiently increased, while the distances from the first magnetic end plate 31 and the second magnetic endplate 32 can be increased. As a result, a larger torque can be obtained.

Figure 39:
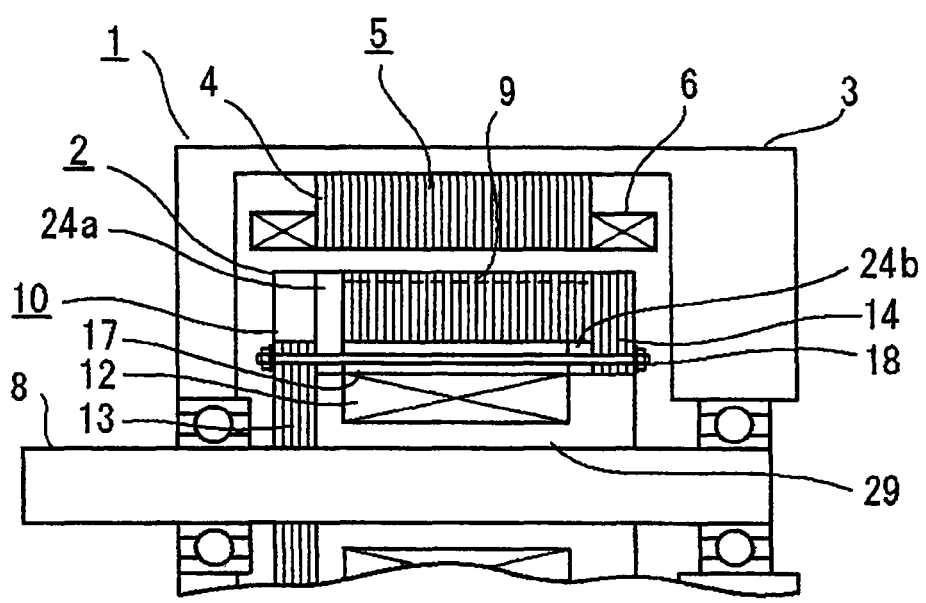
FIG. 39 A schematic sectional view illustrating an example where a field coil is provided to a rotor in a Lundell type rotating machine of the present invention.

In a variation of a Lundell type rotating machine illustrated in FIG. 39, a field coil 12 is fixed to a first magnetic end plate 13 and a second magnetic end plate 14, and is supported by a magnetic base 29 which magnetically couples the field coil 12 with a rotor iron core 10, to thereby constitute a part of a rotor 2. The remaining configuration is the same as that of the fourth embodiment. With this configuration, a radial size of the rotating machine can be reduced. The configuration including the field coil 12 and the magnetic base 29 as a part of the rotor 2 as described above may be applied not only to the fourth embodiment but also to each of the embodiments described above.

The embodiments of the Lundell type rotating machines illustrated and described above are described merely as examples. Various variations are possible for carrying out the present invention. In addition, the features of specific examples of the embodiments may be all or selectively used in combination. Further, for example, for convenience of the assembly work, the notches 19 corresponding to the concave portions or the convex portions 20 of the first magnetic end plate 13 and the second magnetic end plate 14 may be added or omitted as appropriate.

Further, in each of the embodiments described above, the present invention is applied to the Lundell type rotating machines having the brushless structure. Thus, a spark is not generated at a brush or a slip ring portion, thereby improving safety. Moreover, the wear of the brush does not occur, thereby also improving maintenance performance. Therefore, it is preferred that the structure of the Lundell type rotating machine be a brushless structure. However, even with a field structure having a brush, which supplies electric power through an intermediation of the slip ring as in a case of general alternators, the same configuration can be achieved to obtain the same effects.

Further, in the fourth to sixth embodiments, each of the first non-magnetic end plate 24a and the second non-magnetic end plate 24b is an integral circular plate. However, the first non-magnetic end plate 24a and the second non-magnetic end plate 24b may be individual small piece-like plate members each provided so as to abut against the end surfaces of the first magnetic-pole members 15 and the second magnetic-pole members 16 to reduce the leakage of the magnetic flux. Further, the retention ring 36 which radially supports, by the dovetail fitting, the permanent magnets 33 magnetized in the axial direction may be formed as a flange-like portion continuously and integrally extending in the axial direction from the non-magnetic end plate 24a.

INDUSTRIAL APPLICABILITY

The present invention can be used for Lundell type rotating machines.

REFERENCE SIGNS LIST 1 stator, 2 rotor, 3 frame body, 4 stator magnetic pole, 5 stator iron core, 6 stator coil, 7 bearing, 8 rotating shaft, 9 magnetic pole, 10 rotor iron core, 11 permanent magnet, 12 field coil, 13 first magnetic end plate, 14 magnetic end plate, 15 first magnetic pole member, 16 second magnetic pole member, 17 retention body, 18 fastening bolt, 18a fastening bolt, 19 notch, 20 convex portion, 21 inner circumferential edge, 22 dovetail groove, 23 dovetail, 24 void, 24a non-magnetic end plate, 24b non-magnetic end plate 24b, 24c concave portion, 24d convex portions, 25, 26 bolt hole, 27 head portion, 28 peaked portion, 29 magnetic base, 30 magnetic body, 31 first magnetic end plate, 32 second magnetic end plate, 33 permanent magnet, 34 end face, 35 dovetail, 36 retention ring, 37 dovetail groove, 38 magnetic-pole member, 39 boundary.

The invention claimed is:

1. A Lundell type rotating machine comprising:
a stator including a stator iron core having stator magnetic poles, and a stator coil wound around the stator magnetic poles;
a rotating shaft rotating relative to the stator;
a rotor iron core provided on the rotating shaft, having magnetic poles opposed to the stator magnetic poles to be able to magnetically coupled thereto, and rotating relative to the stator inside the stator;
permanent magnets provided between the magnetic poles and magnetized in a circumferential direction of the rotating shaft, for reducing leakage of a magnetic flux between the magnetic poles; and
a field coil provided on a radially inner side of the magnetic poles of the rotor iron core, for generating the magnetic flux in the rotor iron core and the stator iron core,
wherein the rotor iron core comprises:
a first magnetic end plate and a second magnetic end plate, each having a disc-like shape, coaxially supported on the rotating shaft and separated away from each other;
a plurality of first magnetic-pole members arranged in a circumferential direction at intervals, each formed of a laminate of a plurality of magnetic plates laminated in an axial direction of the rotating shaft, each having one end magnetically and mechanically coupled to the first magnetic end plate and another end extending in the axial direction toward the second magnetic end plate so as to be magnetically separated from the second magnetic end plate;
fastening means for fastening the laminates constituting the plurality of first magnetic-pole members to the first magnetic end plate so as to retain the plurality of first magnetic-pole members to the first magnetic end plate;
a plurality of second magnetic-pole members arranged in the circumferential direction at intervals, each formed of a laminate of a plurality of magnetic plates laminated in the axial direction of the rotating shaft, each having one end magnetically and mechanically coupled to the second magnetic end plate and another end extending in the axial direction toward the first magnetic end plate so as to be magnetically separated from the first magnetic end plate, the plurality of second magnetic-pole members being respectively inserted between the plurality of first magnetic-pole members to constitute the magnetic poles in cooperation with the plurality of first magnetic-pole members;
fastening means for fastening the laminates constituting the plurality of second magnetic-pole members to the second magnetic end plate so as to retain the plurality of second magnetic-pole members to the second magnetic end plate; and
a non-magnetic retention body provided between the first magnetic end plate and the second magnetic end plate, for supporting the plurality of first magnetic-pole members and the plurality of second magnetic-pole members over entire lengths thereof,
wherein the plurality of first magnetic-pole members and the plurality of second magnetic-pole members are supported by dovetail grooves formed on an outer circumference of the retention body over an entire length of the dovetail grooves in the axial direction, and
wherein the permanent magnets are supported by the plurality of first magnetic-pole members, the plurality of second magnetic-pole members, and the retention body over entire lengths thereof, are brought into direct contact with circumferential side surfaces of the plurality of first magnetic-pole members and the plurality of second magnetic-pole members, and are locked by peaked portions provided on outer circumferential portions of each of the plurality of first magnetic-pole members and the plurality of second magnetic-pole members so as not to be removed in the radial direction.

2. The Lundell type rotating machine according claim 1, wherein the rotor iron core further includes a first non-magnetic end plate and a second non-magnetic end plate for reducing the leakage of the magnetic flux between the magnetic poles, respectively provided between the plurality of first magnetic-pole members and the plurality of second magnetic end plate and between the second magnetic-pole members and the first magnetic end plate, for magnetic separation therebetween.

3. The Lundell type rotating machine according to claim 2, further comprising third magnetic-pole members provided in an outer circumferential portion of each of the non-magnetic end plates.

4. The Lundell type rotating machine according to claim 3, wherein the third magnetic-pole members include dovetails fitted into and fixed to dovetail grooves provided in the outer circumferential portion of each of the non-magnetic end plates.

5. The Lundell type rotating machine according to claim 4, wherein boundaries between the non-magnetic end plate and the respective third magnetic-pole members each have a tapered or step-like shape.

6. The Lundell type rotating machine according to claim 3, wherein boundaries between the non-magnetic end plate and the respective third magnetic-pole members each have a tapered or step-like shape.

7. The Lundell type rotating machine according to claim 1, wherein permanent magnets magnetized in the axial direction are also provided between each of the first magnetic end plate and the second magnetic end plate and the other ends of the plurality of first magnetic-pole members and of the plurality of second magnetic-pole members.

8. The Lundell type rotating machine according to claim 1, further comprising magnetic bodies extending in the axial direction, inserted between the retention body and each of the plurality of first magnetic-pole members and the plurality of second magnetic-pole members.

9. The Lundell type rotating machine according to claim 8, wherein the magnetic body comprises a pressurized-powder magnetic core obtained by compressing and molding a magnetic powder.

10. The Lundell type rotating machine according to claim 1, further comprising notches, each having the same shape as the shape of each of dovetail grooves, provided at positions on the first magnetic end plate and the second magnetic plate, the positions obtained by extending the dovetail grooves of the retention body in the axial direction.

11. The Lundell type rotating machine according to claim 1, further comprising fastening means different from the fastening means, passing through the retention body to fasten the retention body to the first magnetic end plate and the second magnetic end plate.

* * * * *